(12) United States Patent
Maeda et al.

(10) Patent No.: US 8,675,521 B2
(45) Date of Patent: Mar. 18, 2014

(54) NODE RELATED INFORMATION COLLECTING SYSTEM, NODE DEVICE AND FRAME PROCESSING METHOD

(75) Inventors: Kenji Maeda, Fukuoka (JP); Mitsuharu Amano, Fukuoka (JP); Kenji Yamada, Kawasaki (JP); Syouichi Urata, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 13/402,313

(22) Filed: Feb. 22, 2012

(65) Prior Publication Data

US 2012/0155331 A1 Jun. 21, 2012

Related U.S. Application Data

(63) Continuation of application No. PCT/JP2009/007026, filed on Dec. 18, 2009.

(30) Foreign Application Priority Data

Aug. 31, 2009 (JP) .................................. 2009-199453

(51) Int. Cl.
H04L 12/28 (2006.01)

(52) U.S. Cl.
USPC ............................. 370/255; 370/252; 370/392

(58) Field of Classification Search
None
See application file for complete search history.

(56) References Cited

U.S. PATENT DOCUMENTS

| 2001/0055306 A1* | 12/2001 | Nakatsugawa et al. ....... 370/392 |
| 2003/0091001 A1 | 5/2003 | Watanabe |
| 2004/0052259 A1 | 3/2004 | Garcia et al. |
| 2012/0106552 A1* | 5/2012 | Iwao et al. .................... 370/392 |

FOREIGN PATENT DOCUMENTS

| EP | 1 401 147 A1 | 3/2004 |
| JP | 2003-152786 | 5/2003 |
| JP | 2004-112791 | 4/2004 |
| JP | 2006-237849 | 9/2006 |

OTHER PUBLICATIONS

International Search Report for PCT/JP2009/007026 mailed Mar. 23, 2010.

* cited by examiner

*Primary Examiner* — Ian N Moore
*Assistant Examiner* — Latresa McCallum
(74) *Attorney, Agent, or Firm* — Staas & Halsey LLP

(57) ABSTRACT

In a system including a plurality of node devices that form an ad hoc network (5), a node device (N06) receives, from another node device (N08; N04), first frame data including identification information of a source node device and a destination node device. If node related information of only the node device can be additionally stored in the received first frame data, the node device generates second frame data including the identification information of the source node device (N01; N11) or the destination node device (N11; N01) as destination identification information, node related information within the first frame data, and the node related information of the node device, also generates third frame data that does not include the node related information within the first frame data, and transfers the generated second and third frame data to another node device (N02, N04; N08).

14 Claims, 16 Drawing Sheets

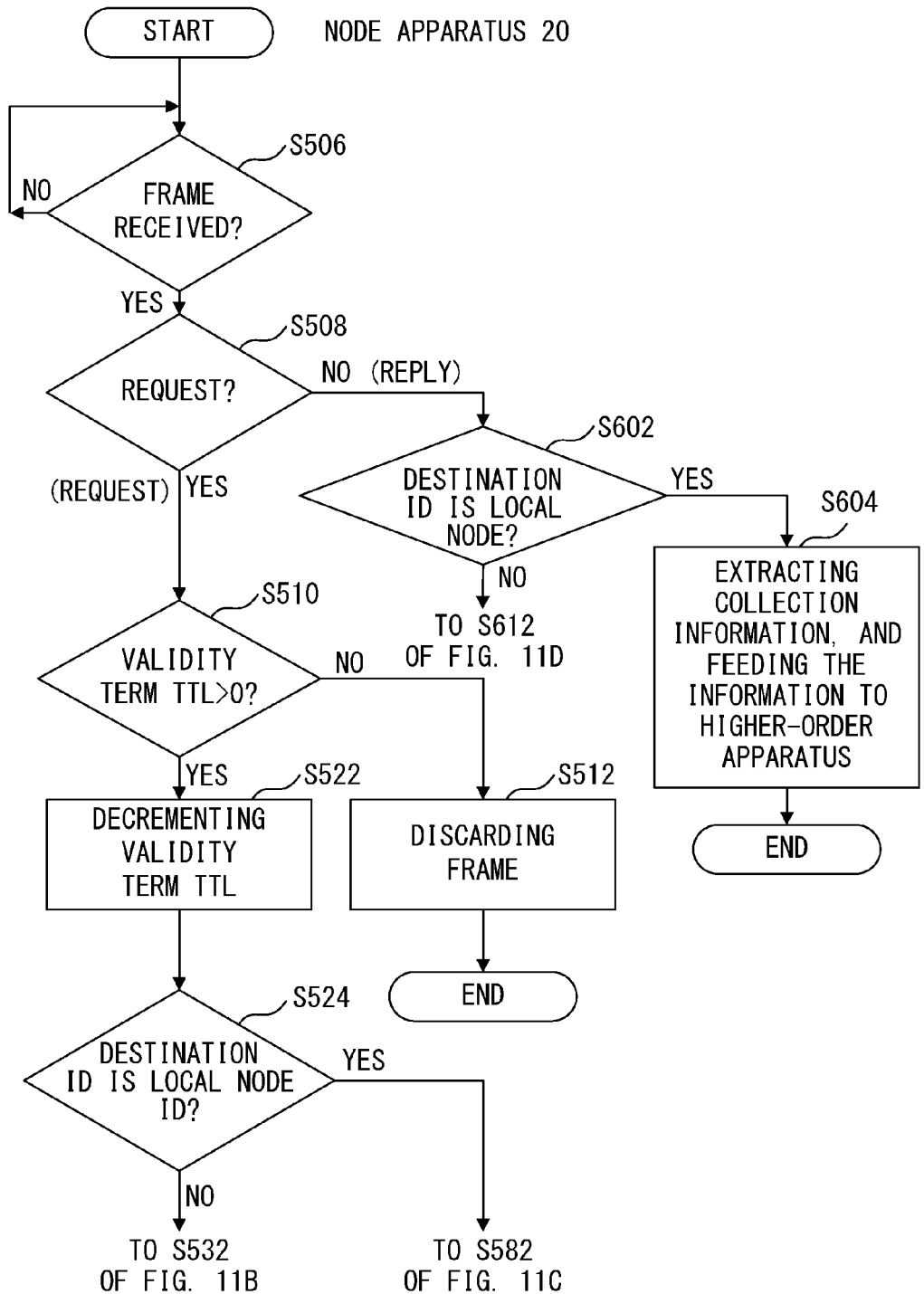
F I G. 1 1 A

NODE RELATED INFORMATION COLLECTING SYSTEM, NODE DEVICE AND FRAME PROCESSING METHOD

CROSS REFERENCE TO RELATED APPLICATIONS

This application is a continuation application, filed under 35 U.S.C. §111(a), of International Application PCT/JP2009/007026, filed Dec. 18, 2009, which claimed priority to Japanese Application No. 2009-199453, filed Aug. 31, 2009, the disclosures of which are hereby incorporated by reference.

FIELD

The present invention relates to collection of information related to node devices in an ad hoc network, and more particularly, to a system, an device and a method for collecting information related to node devices on a frame transfer path in an ad hoc network.

BACKGROUND

In a wired or wireless local network such as an ad hoc network or the like, a request packet is transmitted and a reply packet is returned between two relay terminals as node devices in an infrastructure mode or an ad hoc mode. A packet transfer path between two node devices is fixed in the infrastructure mode, whereas a packet transfer path (route) between two node devices is changeable in the ad hoc mode.

With a known method for searching for an optimum route needed for a communication in a local network such as an ad hoc network or the like, a wireless terminal connected to the local network sets a bit error rate and a transfer rate between the wireless terminal and its adjacent wireless terminal, and calculates, based on the bit error rate and the transfer rate, a route weight value for a link between the wireless terminals. A certain wireless terminal issues a route search command based on the route weight value and notifies an adjacent terminal of the route weight value in order to set a route for communicating with another wireless terminal. The adjacent terminal similarly propagates the route search command, and sequentially adds the route weight value at this time. The communication counterpart wireless terminal decides an optimum route based on the route weight value after being added, and returns the route to a starting point side.

PRIOR ART DOCUMENTS

Patent Document

Patent Document 1: Japanese Laid-open Patent Publication No. 2003-152786

SUMMARY

According to one aspect of an embodiment of the present invention, a system includes a plurality of node devices that form an ad hoc network, and collects node related information of node devices on a transfer path of frame data. Each of the plurality of node devices includes: a storing unit configured to store node related information including identification information of the node device; a data processing unit configured to process frame data; and a communication controlling unit configured to receive first frame data including identification information of a source node device and a destination node device from a different node device among the plurality of communication node devices. If node related information of two or more node devices can be additionally stored in the received first frame data, the data processing unit updates the received first frame data by adding the node related information stored in the storing unit, and the communication controlling unit transfers the updated first frame data to a different node device among the plurality of communication node devices. If node related information of only one node device can be additionally stored in the received first frame data, the data processing unit generates second frame data including the identification information of the source node device or the identification information of the destination node device as destination identification information, the node related information within the received first frame data, and the node related information, stored in storing unit, of the node device, and also generates third frame data that does not include the node related information within the received first frame data, and the communication controlling unit respectively transfers the generated second frame data and the third frame data to a different node device among the plurality of communication node devices.

The object and advantages of the invention will be realized and attained by means of the elements and combinations particularly pointed out in the claims.

It is to be understood that both the foregoing general description and the following detailed description are exemplary and explanatory and are not restricted of the invention, as claimed.

BRIEF DESCRIPTION OF DRAWINGS

FIG. 8B (as explained with FIG. 8A);

FIG. 9B (as explained with FIG. 9A);

FIG. 11A~FIG. 11D are schematics illustrating an example of a flowchart for receiving and transferring a request frame and a reply frame by each of the node devices;

FIG. 11B (as explained with FIG. 11A);
FIG. 11C (as explained with FIG. 11A); and
FIG. 11D (as explained with FIG. 11A).

Figure 1:
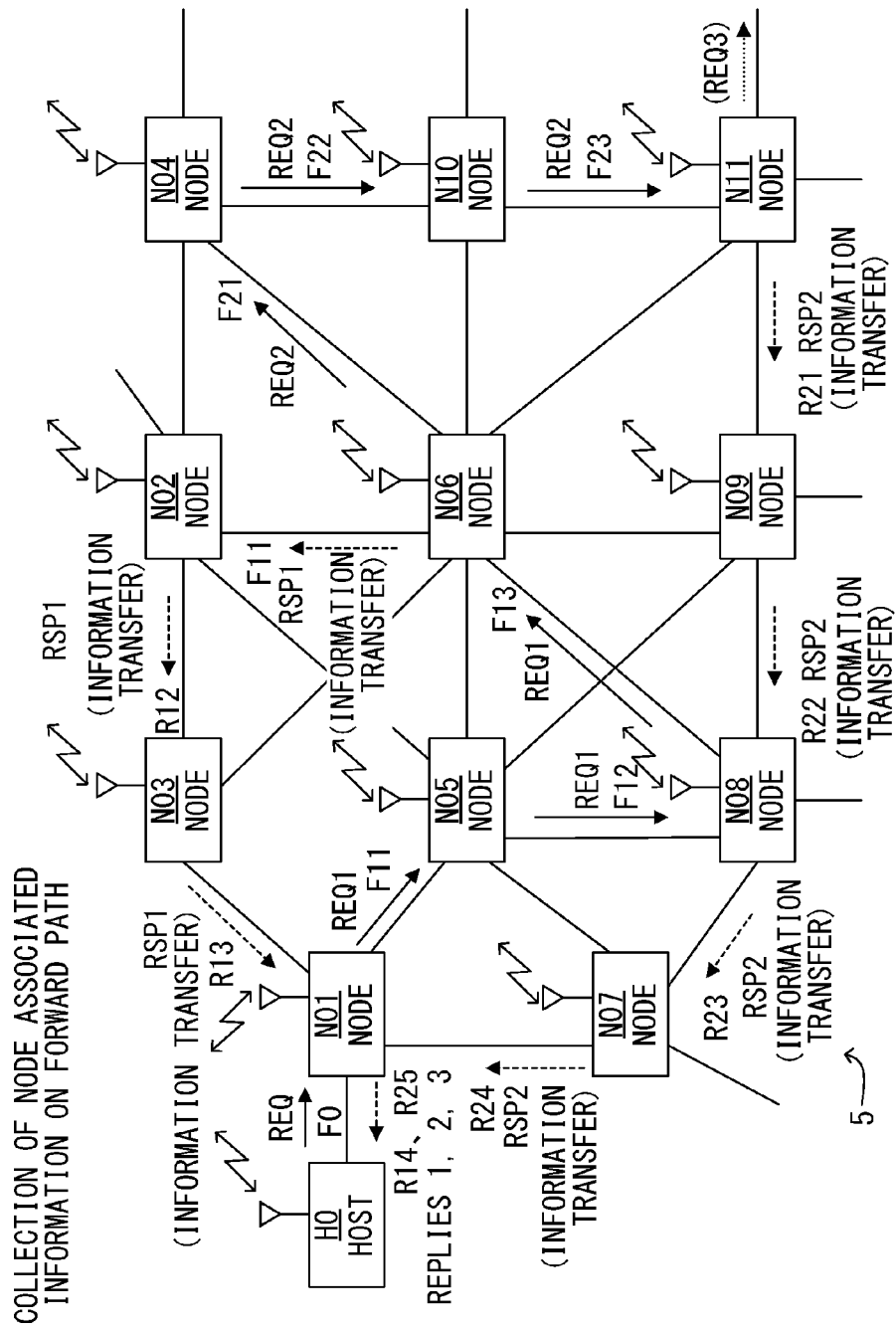
FIG. 1 illustrates an example of collection of information related to node devices on a forward path in a system including a host device and node devices, which form an ad hoc network, in an embodiment of the present invention.

DESCRIPTION OF PREFERRED
EMBODIMENTS

The object and advantages of the embodiments of the invention will be realized and attained by means of the elements and combinations specifically pointed out in the claims.

It is to be understood that both the foregoing general description and the following detailed description are exemplary and explanatory and are not restrictive of the embodiments of the invention as claimed.

An administrator of an ad hoc network sometimes may need, as maintenance information of a network system, a transfer path used when a packet is transferred between two node devices on the network in an infrastructure mode or an ad hoc mode. A source node device transmits a request frame for tracing a packet transfer path to a destination node device, and each node device on the path adds identification information of the node device itself to the request frame for maintenance, so that the destination node device can collect the identification information of node devices on the path as path information. The length of the request frame for maintenance may be fixed or variable. However, the length of the frame has an upper limit. Therefore, if the number of node devices or the number of relays (the number of hops, the number of relay nodes) between adjacent node devices on the frame transfer path exceeds a maximum number, identification information of all node devices on the path cannot be collected.

For example, when a transfer path of a packet on the Ethernet (registered trademark) is examined, a data size within a frame having a maximum length of 1518 bytes is 1500 bytes. For example, if the number of node devices on the path exceeds 214 when 7-byte identification information of a node device is collected, identification information of all node devices cannot be collected.

The present inventor et al. recognized that when the amount of collected information within a frame reaches an upper limit storage capacity of a node device on a frame transfer path in an ad hoc network, a received frame can be transferred to the next node device by deleting the collected information within the frame to form an empty area, and the deleted information can be stored in a reply frame, which can be transmitted to a source node device.

An object of the present invention is to enable information related to node devices on a path to be collected regardless of the number of node devices on the path.

In one aspect of an embodiment of the present invention, information of node devices on a path can be collected regardless of the number of node devices on the path.

Non-limiting embodiments according to the present invention are described by referring to the drawings. In the drawings, similar components and elements are denoted with like reference numerals.

FIG. 1 illustrates an example of collection of information related to node devices N01 to N11 on a forward path in a system including a host device H0 and the node devices, which form an ad hoc network 5, in an embodiment according to the present invention. Each of the node devices N01 to N11 may be wiredly or wirelessly connected to one or more adjacent node devices.

Each of the node devices N01 to N11 may wirelessly communicate with other node devices via one wireless base station. The ad hoc network 5 may be a wireless network or a wired network. Its transfer mode may be an infrastructure mode or an ad hoc mode.

The host device H0 feeds, to the node device N01 connected thereto, a request command F0 for tracing a path or a route up to a destination node device N11 and for collecting node related information. In this case, the transfer mode is assumed to be the ad hoc mode. In the ad hoc mode, each node device transfers a frame on a variable node path according to, for example, a routing rule for distributing a load. However, the transfer mode may be the infrastructure mode. In the infrastructure mode, each node device transfers a frame according to, for example, a routing rule for forming a preset node path.

The node device N01 generates a request frame for collecting node related information on a forward path, or an information collection request frame REQ1. The request frame REQ1 from the node device N01 includes identification information (ID:01) of the node device N01 and arbitrarily includes other information as node related information in a first collection data area among a plurality of collection data areas. In the ad hoc mode, an adjacent node device that transfers a received frame or packet transmitted by each of the node devices N01 to N11 is decided and selected according to predetermined control and routing rules in each of the node devices. In this case, a forward transfer path of the request frame REQ1 is, for example, a path formed by node devices N01, N05, N08, N06, N04, N10 and N11.

Figure 2:
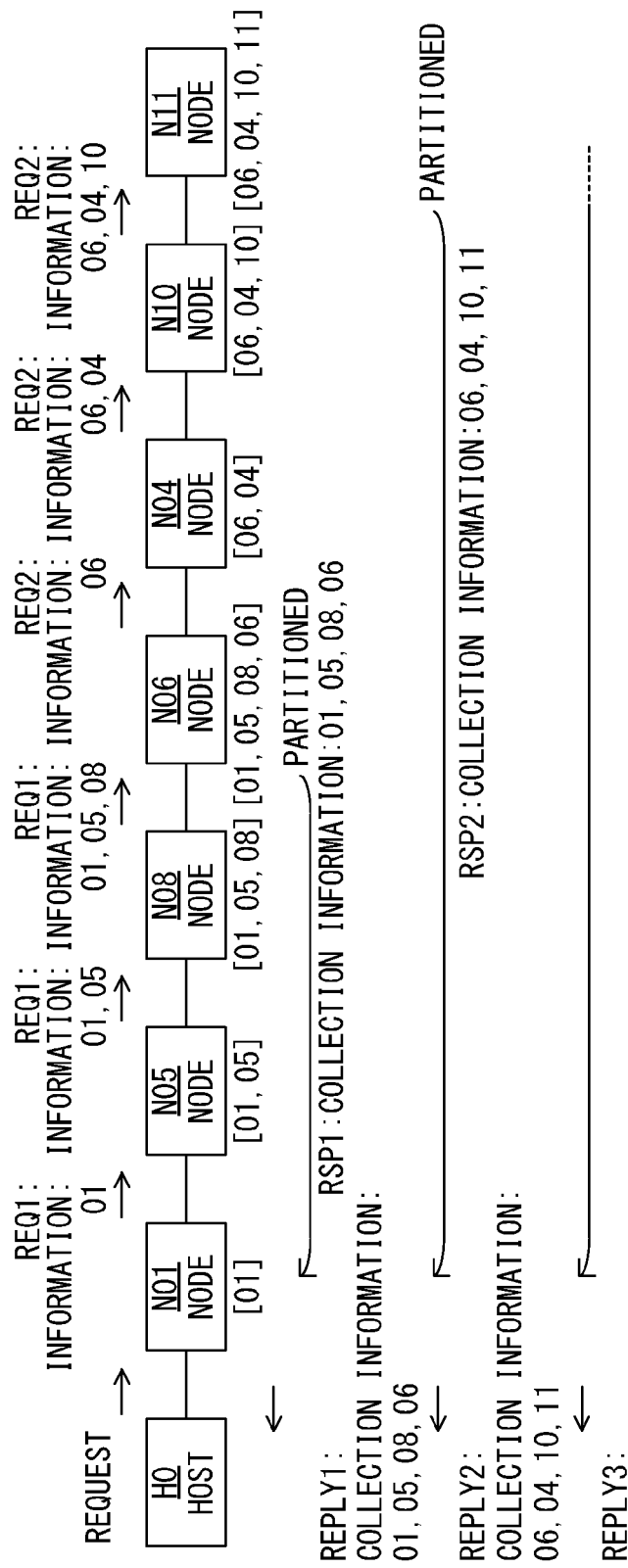
FIG. 2 illustrates an example of generation of partitioned reply frames for collecting node association information of a plurality of node devices on the forward path.

FIG. 2 illustrates an example of generation of partitioned reply frames for collecting node related information of the plurality of node devices N01, N05, N08, N06, N04, N10 and N11 on the forward path.

Collected information related to the node devices may be, for example, related communication quality information and operation state information of the node devices, or information of data detected by an related sensor in addition to identification information (IDs) of the node devices. A series of linked pieces of collected identification information of the node devices represents a forward path of a transfer frame. The communication quality information may be, for example, a communication quality and/or an error rate of a link between a node device at a detected position and its adjacent node device. The operation state information may be, for example, a CPU use rate, a memory use rate, the number of communications, the number of communication errors, and/or various types of statistical information of a node device at a detection date and time. The sensor may be, for example, a temperature sensor, a wind velocity sensor, a vibration sensor and/or an acceleration sensor or the like. Data detected by the sensor may be, for example, a temperature, a wind velocity and/or a vibration level (such as an acceleration rate) or the like at the detection date and time.

Referring to FIGS. 1 and 2, the node device N01 transfers the request frame REQ1, for example, to an adjacent node device N05 on a forward link F11 in the ad hoc mode. The node device N05 adds identification information (ID:05) of the node device N05 and arbitrarily adds node related information to a second collection data area among a plurality of collection data areas within the received request frame REQ1.

The node device N05 transfers the request frame REQ1, for example, to an adjacent node device N08 on a forward link F12. The node device N08 adds identification information (ID:08) of the node device N05 and arbitrarily adds other node related information to a third collection data area among the plurality of collection data areas within the request frame REQ1.

The node device N08 transfers the request frame REQ1, for example, to an adjacent node device N06 on a forward link F13. The node device N06 determines that a remaining empty data collection area among the plurality of collection data areas within the received request frame REQ1 is the last area. Then, the node device N06 updates the received request frame REQ1 to a request frame REQ2 by adding identification information (ID:06) of the node device N06 and arbitrarily adding other node related information to the first collection data area after erasing data of all the collection data areas within the request frame REQ1. In an alternate embodiment, the identification information (ID:06) of the node device N06 and the other node related information may not be added to the request frame REQ2. At this time, the request frame REQ2 can be recognized as a frame that has been newly generated based on the received request frame REQ1.

Additionally, since the remaining empty collection data area among the plurality of collection data areas within the received request frame REQ1 is the last area, the node device N06 generates a reply frame RSP1 for returning the collected accumulated information to the source node device N01. At this time, the reply frame RSP1 can be also recognized as a frame obtained by updating the received request frame REQ1. The node device N06 copies the data of the plurality of collection data areas within the request frame REQ1, namely, the node related information to a plurality of collection data areas within the reply frame RSP1, and adds the identification information (ID:05) of the node device N06 and arbitrarily adds other node related information to the last collection data area. The reply frame RSP1 includes the identification information of the node devices N01, N05, N08 and N06 on the forward path and the arbitrarily added other node related information in the plurality of collection data areas as the collected node related information.

The node device N06 transfers the request frame REQ2, for example, to an adjacent node device N08 on a forward link F21. The node device N06 transfers the reply frame RSP1, for example, to an adjacent node device N02 on a return link R11. The reply frame RSP1 is transferred to the node device N03 on a return link R12, and further transferred to the node device N01 on a return link R13 with no change in the data of the plurality of collection data areas. The destination node device N01 receives the reply frame RSP1, and stores the data of the plurality of collection data areas, namely, the node related information within the reply frame RSP1 in a memory or storing unit of the node device N01.

The node device N04 adds the identification information (ID:04) of the node device N04 and arbitrarily adds other node related information to the second collection data area among the plurality of collection data areas within the received request frame REQ2.

The node device N04 transfers the request frame REQ2, for example, to the adjacent node device N10 on a forward link F22. The node device N10 adds identification information (ID:10) of the node device N10 and arbitrarily adds other node related information to the third collection data area among the plurality of collection data areas within the received request frame REQ2.

The node device N10 transfers the request frame REQ2, for example, to the adjacent node device N11 on a forward link F23. The node device N11 determines that the local node device N11 is the destination of the received request frame REQ2, and generates a reply frame RSP2 for transmitting the collected information to the source node device N01. At this time, the reply frame RSP2 can be also recognized as a frame obtained by updating the received request frame REQ2. The reply frame RSP2 includes the identification information of the node devices N06, N04, N10 and N11 on the forward path and the arbitrarily added other node related information in the plurality of collection data areas as collected node related information.

The node device N11 transfers the reply frame RSP2, for example, to an adjacent node device N09 on a return link R21. The reply frame RSP2 is further transferred to the node device N08 on a return link R22, to the node device ZN07 on a return link R23, and to the node device N01 on a return link R24. The destination node device N01 receives the reply frame RSP2, and stores the node related information of the plurality of collection data areas within the reply frame RSP2 in a memory of the node device N01.

If the node device N11 is not the destination of the request frame REQ2, the node device N11 operates similarly to the node device N10 or N06. In this case, if a remaining empty collection data area among the plurality of collection data areas within the received request frame REQ2 is the last area, the node device N11 updates the received request frame REQ2 to a request frame REQ3 by adding identification information (ID:11) of the node device N11 and arbitrarily adding other node related information to the first collection data area after erasing the data of the plurality of collection data areas within the request frame REQ2. In an alternate embodiment, the identification information (ID:11) of the node device N11 and the other node related information may not be added to the request frame REQ3. The node device N11 transfers the request frame REQ3 to an adjacent node device. In this case, the reply frame RSP3 generated by another node device is transferred to the node device N01 via a plurality of return links. The destination node device N01 receives the reply frame RSP3, and stores the node related information of the plurality of collection data areas within the reply frame RSP3 in a memory of the node device N01.

In this way, the node device N01 collects the identification information of the node devices N01, N05, N08, N06, N04, N10 and N11 on the forward transfer path of the request frames REQ1, REQ2 and the like and the other node related information by using the partitioned reply frames RSP1, RSP2 and the like, and feeds the collected information to the host device H0 as replies 1, 2 and the like. In this way, the node related information on the forward path is collected.

The host device H0 edits and statistically processes the identification information of the node devices and the other node related information of the replies 1, 2 and the like, and displays the information on a display device, for example, as maintenance information. The maintenance information may represent, for example, statistical information (such as a ratio of a transfer path) of a transfer node path of a frame, and a load distribution, a communication quality distribution, an error distribution, a temperature distribution, a wind velocity distribution and a vibration level distribution of node devices on a transfer path of a frame. An administrator of the system can, for example, adjust routing rules and a load imposed on the node devices based on the information, or can address a fault or a trouble of a node device.

Figure 3:
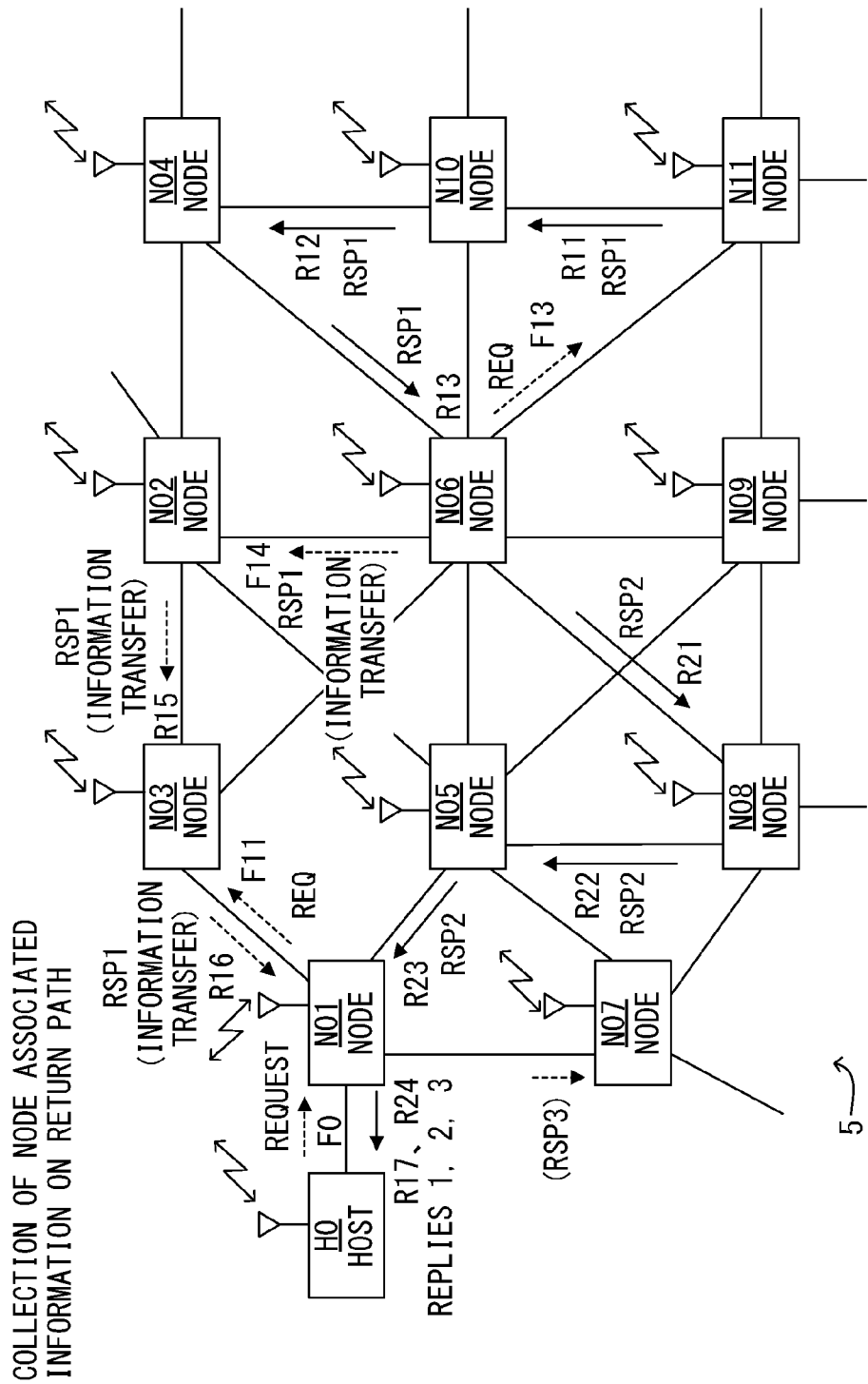
FIG. 3 illustrates an example of collection of information related to node devices on a return path in the system on the ad hoc network of FIG. 1 in another embodiment of the present invention.

FIG. 3 illustrates an example of collection of information related with node devices on a return path in the system on the ad hoc network 5 illustrated in FIG. 1 in another embodiment of the present invention. Its transfer mode may be the infrastructure mode or the ad hoc mode.

The host device H0 feeds, to the node device N01 connected thereto, a request command F0 for tracing a path or a route up to the destination node device N11 and for collecting node related information. In this case, the transfer mode is assumed to be the ad hoc mode. However, the transfer mode may be the infrastructure mode.

The node device N01 generates a request frame for collecting node related information on the return path, or an information collection request frame REQ. The request frame REQ issued from the node device N01 may not include node related information in the first collection data area among a plurality of collection data areas. In this case, a forward transfer path of the request frame REQ is assumed to be a path formed by, for example, the node devices N01, N03, N06 and N11.

The destination node device N11 generates a reply frame RSP1 for collecting node related information on the return path in response to the received request frame REQ. The reply frame RSP1 from the node device N11 includes the identification information (ID:11) of the node device N11 and arbitrarily includes other information in the first collection data area among the plurality of collection data areas as node related information. In this case, a return transfer path of the reply frame RSP is assumed to be a path formed by, for example, the node devices N11, N10, N04, N06, N08, N05 and N01.

Figure 4:
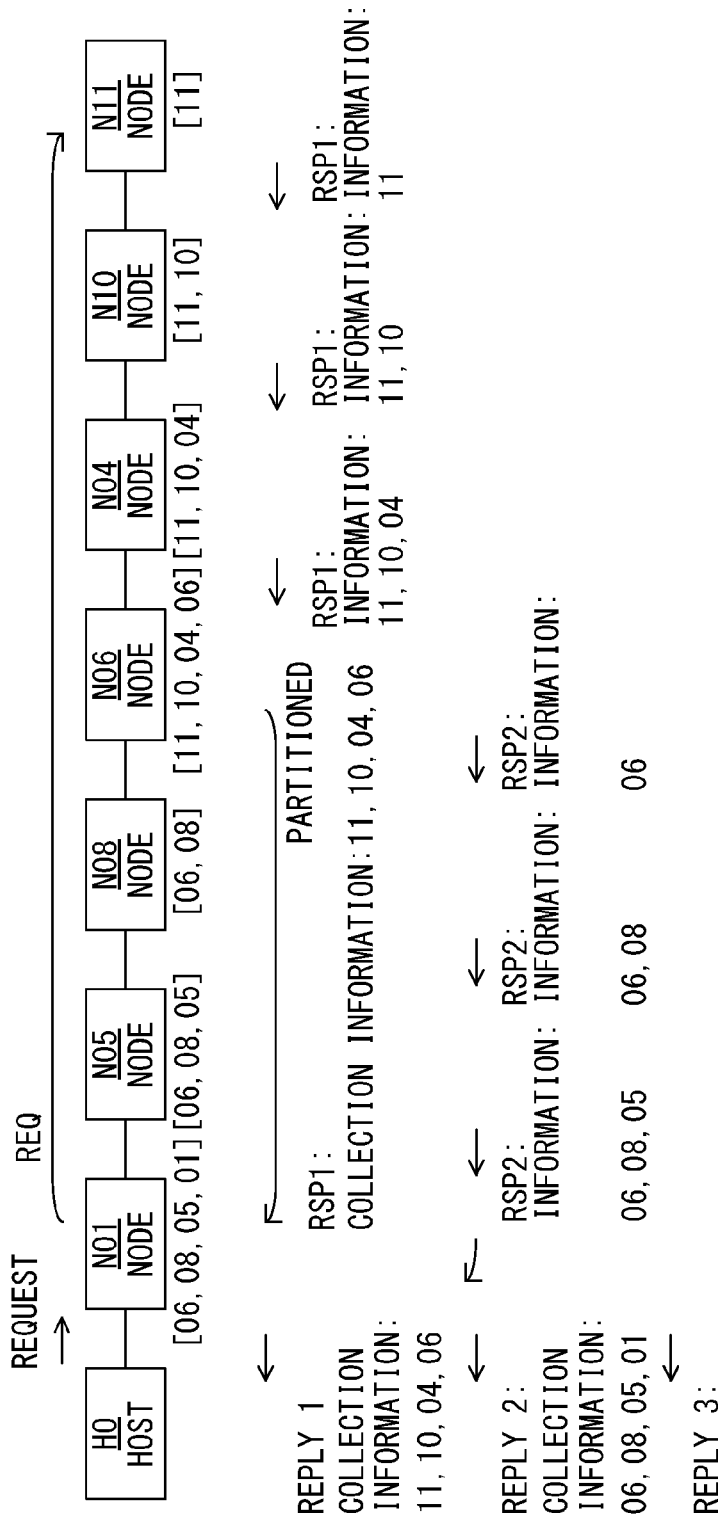
FIG. 4 illustrates an example of generation of partitioned reply frames for collecting node related information of a plurality of node devices on the return path.

FIG. 4 illustrates an example of generation of partitioned reply frames for collecting the node related information of the plurality of node devices N11, N10, N04, N06, N08, N05 and N01 on the return path. The collected information of the node devices is as described above.

Referring to FIGS. 3 and 4, the node device N11 transfers the reply frame RSP1, for example, to the adjacent node device N10 on the return link R11 in the ad hoc mode. The node device N10 adds the identification information (ID:10) of the node device N10 and arbitrarily adds other node related information to the second collection data area among the plurality of collection data areas within the received reply frame RSP1.

The node device N10 transfers the reply frame RSP1, for example, to the adjacent node device N04 on the return link R12. The node device N04 adds the identification information (ID:04) of the node device N04 and arbitrarily adds other node related information to the third collection data area among the plurality of collection data areas within the received reply frame RSP1.

The node device N04 transfers the reply frame RSP1, for example, to the adjacent node device N06 on the return link R13. The node device N06 determines that a remaining empty collection data area among the plurality of collection data areas within the received reply frame RSP1 is the last area. Then, the node device N06 generates a partitioned reply frame RSP2 for collecting node related information on the return path. At this time, the reply frame RSP2 can be also recognized as a frame obtained by updating the received request frame REQ1. In this case, the node device N06 erases data of the plurality of collection data areas within the reply frame RSP2. The node device N06 adds the identification information (ID:06) of the node device N06 and arbitrarily adds other node related information to the first collection data area in the generated or updated reply frame RSP2. In an alternate embodiment, the identification information (ID:06) of the node device N06 and the other node related information may not be added to the reply frame RSP2.

Additionally, the node device N06 updates the received reply frame RSP1 as a partitioned frame in order to transmit collected accumulated information to the destination node device N01. At this time, the reply frame RSP1 can be recognized as a frame newly generated based on the received reply frame RSP1. The node device N06 adds the identification information (ID:06) of the node device N06 and arbitrarily adds other node related information to the last collection data area within the partitioned reply frame RSP1. The reply frame RSP1 includes, as the collected node related information, the identification information of the node devices N11, N10, N04 and N06 on the return path and arbitrarily includes the other node related information in the plurality of collection data areas. The reply frame RSP1 is transmitted to the destination node device N01 with no further node related information added.

The node device N06 transfers the reply frame RSP1, for example, to the adjacent node device N02 on a return link R14. The node device N02 transfers the reply frame RSP1, for example, to the adjacent node device N03 on a return link R15. The reply frame RSP1 is transferred to the node device N01 on a return link R16. The destination node device N01 receives the reply frame RSP1, and stores the node related information of the plurality of collection data areas within the reply frame RSP1 in a memory of the node device N01.

The node device N06 transfers the reply frame RSP2, for example, to the adjacent node device N08 on the return link R21. The node device N08 adds the identification information (ID:08) of the node device N08 and arbitrarily adds other node related information to the second collection data area among the plurality of collection data areas within the received reply frame RSP2.

The node device N08 transfers the reply frame RSP2, for example, to the adjacent node device N05 on the return link R22. The node device N05 adds the identification information (ID:05) of the node device N05 and arbitrarily adds other node related information to the third collection data area among the plurality of collection data areas within the received reply frame RSP2.

The node device N05 transfers the reply frame RSP2, for example, to the adjacent destination node device N01 on the return link R23. The node device N01 adds the identification information (ID:01) of the node device N01 and arbitrarily adds other node related information to the fourth collection data area among the plurality of collection data areas within the received reply frame RSP2. Since the node device N05 is the destination of the received reply frame RSP2, the node related information of the plurality of collection data areas within the reply frame RSP2 is stored in a memory of the node device N05.

If the node device N01 is not the destination of the reply frame RSP2, the node device N01 operates similarly to the node device N06. In this case, the node device N01 generates a partitioned reply frame RSP3 for collecting node related information on the return path. The node device N01 adds the identification information (ID:01) of the node device N01 and arbitrarily adds other node related information to the first collection data area within the reply frame RSP3. In an alternate embodiment, the identification information (ID:01) of the node device N01 and the other node related information may not be added to the reply frame RSP3. Moreover, the node device N01 updates the reply frame RSP2 received to transmit collected accumulated information to the destination node device as a partitioned frame. The node device N01 adds the identification information (ID:01) of the node device N01 and arbitrarily adds other node related information to the last collection data area within the partitioned reply frame RSP2.

In this way, the node device N01 collects the identification information of the node devices N11, N10, N04, N06, N08, N05 and N01 on the return path and the other node related information in the reply frame RSP by using the partitioned replies RSP1, RSP2 and the like, and feeds the collected information to the host device H0 as replies 1, 2 and the like. In this way, the node related information on the return path can be collected.

The host device H0 edits the identification information of the node devices and the other node related information in the replies 1, 2 and the like, and displays the edited information on the display device.

Figure 5:
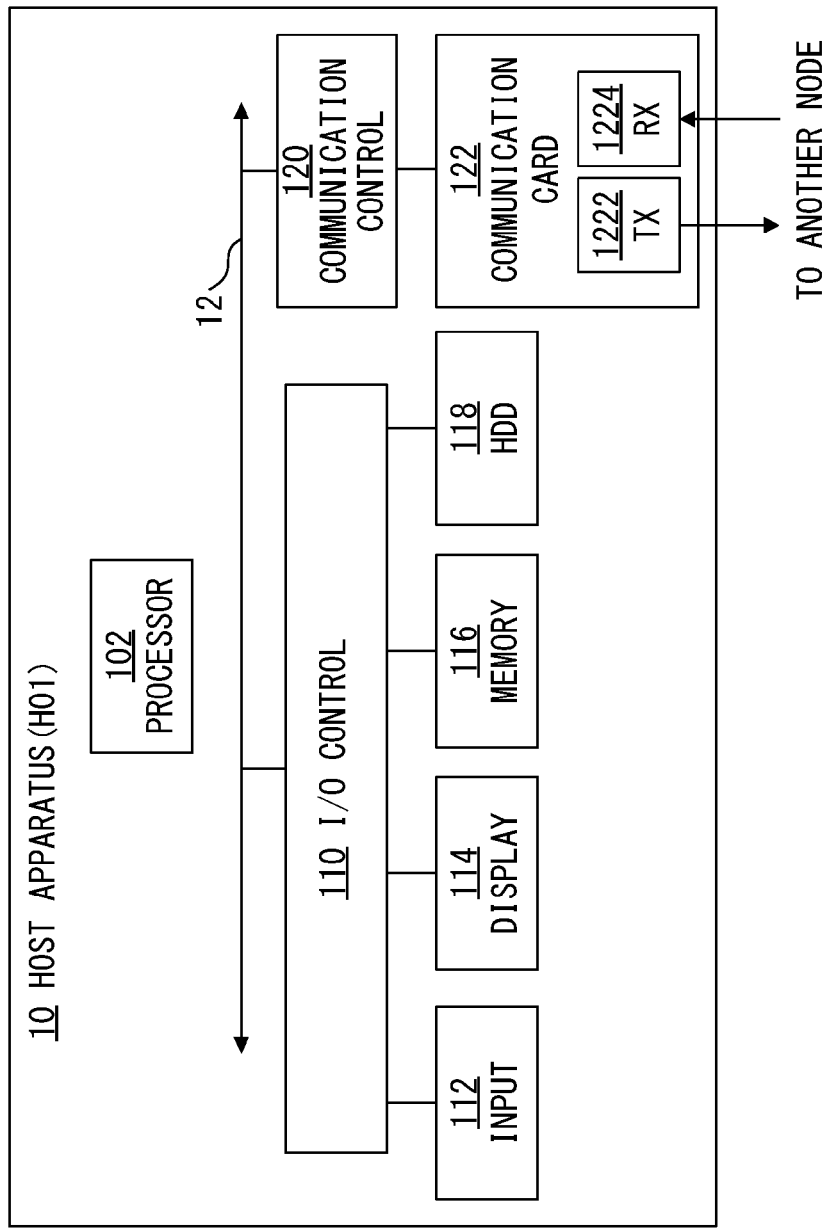
FIG. 5 schematically illustrates one example of a configuration of the host device illustrated in FIGS. 1 to 4.

FIG. 5 schematically illustrates one example of a configuration of the host device 10 (H0) illustrated in FIGS. 1 to 4.

The host device 10 (H0) includes a processor 102 such as a CPU, an input/output (I/O) controlling unit 110 and a communication controlling unit 120, which are connected to an internal bus 12. To the input/output controlling unit 110, an input device 112, a display device 114, a memory 116, a hard disk drive (HDD) 118 and the like are connected. The memory 116 and/or the hard disk drive (HDD) 118 stores a program and data. To the communication controlling unit 120, at least one communication card 122 is connected. The communication card 122 is a wireless or wired communication card, and is connected to another node device via a wireless or wired communication link. The communication card 122 includes a transmitter (TX) 1222 and a receiver (RX) 1224. The transmitter 1222 and the receiver 1224 may be one transmitter-receiver. The host device 10 may be, for example, a personal computer.

Figure 6:
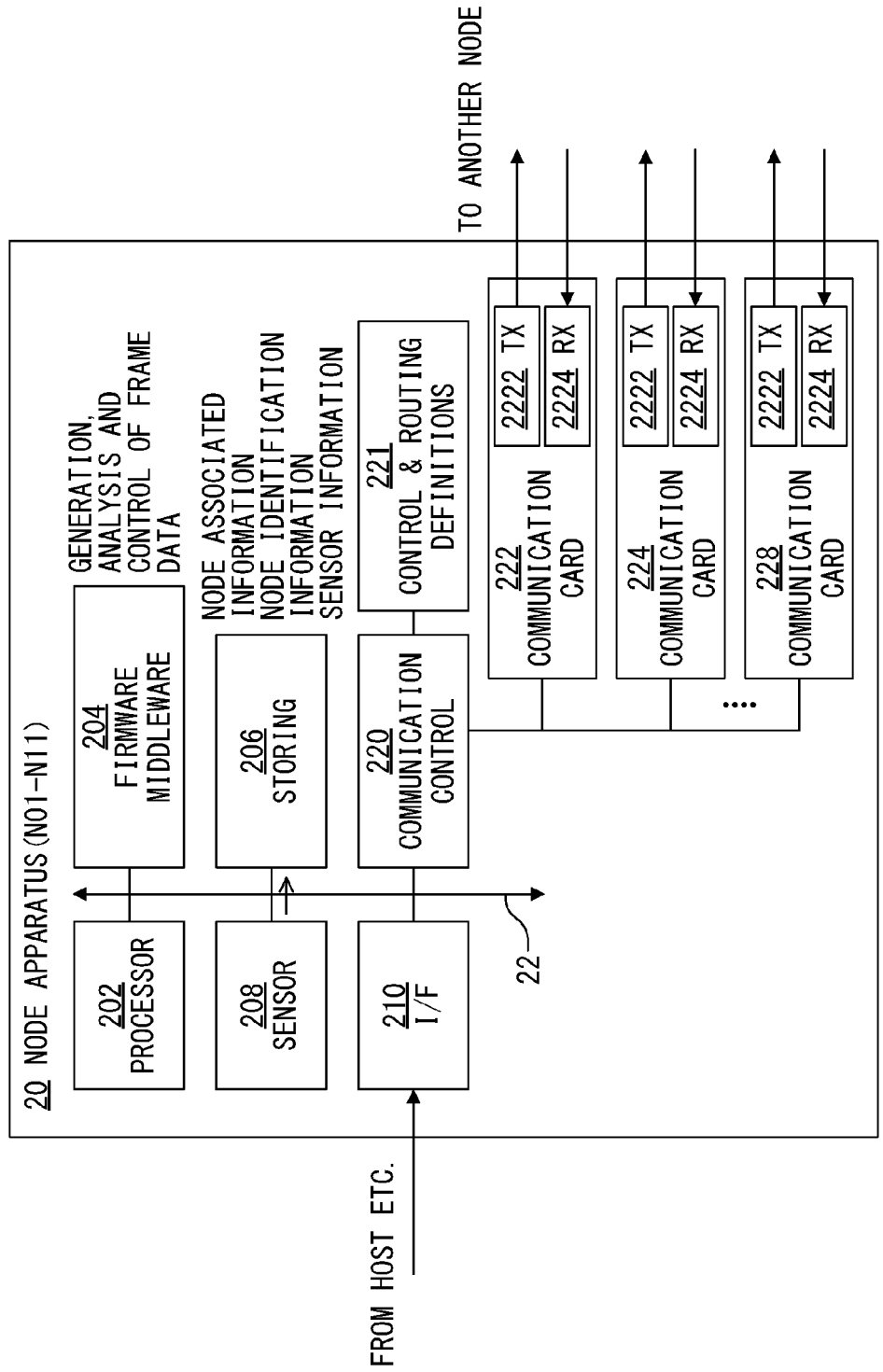
FIG. 6 schematically illustrates one example of a configuration of the node devices illustrated in FIGS. 1 to 4.

FIG. 6 schematically illustrates one example of a configuration of the node devices 20 (N01 to N11) illustrated in FIGS. 1 to 4.

The node devices 20 (N01 to N11) respectively include a processor 202 such as a CPU, a storing unit 204 configured to store firmware and middleware, a storing unit 206, a sensor 208, an interface (I/F) 210, and a communication controlling unit or a frame communicating unit 220 configured to control a frame communication between node devices. These components are connected to an internal bus 22. The node devices 20 (N01 to N11) may be, for example, a stationary- or mobile-type relay device, terminal, personal computer, portable terminal, router, or a measurement device or an observation station for a physical amount or a physical condition. The storing unit 206 stores a program, data, node related information, sensor information and the like. The processor 202 processes, assembles, generates, edits, analyzes and controls frame data according to the firmware or middleware stored in the storing unit 204. The interface (I/F) 210 is connected a higher-order device such as the host device 10.

The communication controlling unit 220 is connected to communication cards, 222, 224, . . . , 228. The communication controlling unit 220 generates, edits, analyzes and controls a frame and a frame header. Moreover, the communication controlling unit 220 causes the communication cards 222, 224, . . . , 228 to transmit and receive a frame according to rules stipulated in control and routing definition files stored in the storing unit 221. The control and routing rules stipulate, for example, a rule for controlling a load distribution or the like. The communication cards 222 to 228 are wireless or wired communication cards, and are connected to a communication card of another node device via a wireless or wired communication link. The communication cards 222 to 228 respectively include the transmitter (TX) 2222 and the receiver (RX) 2224.

Figure 7:
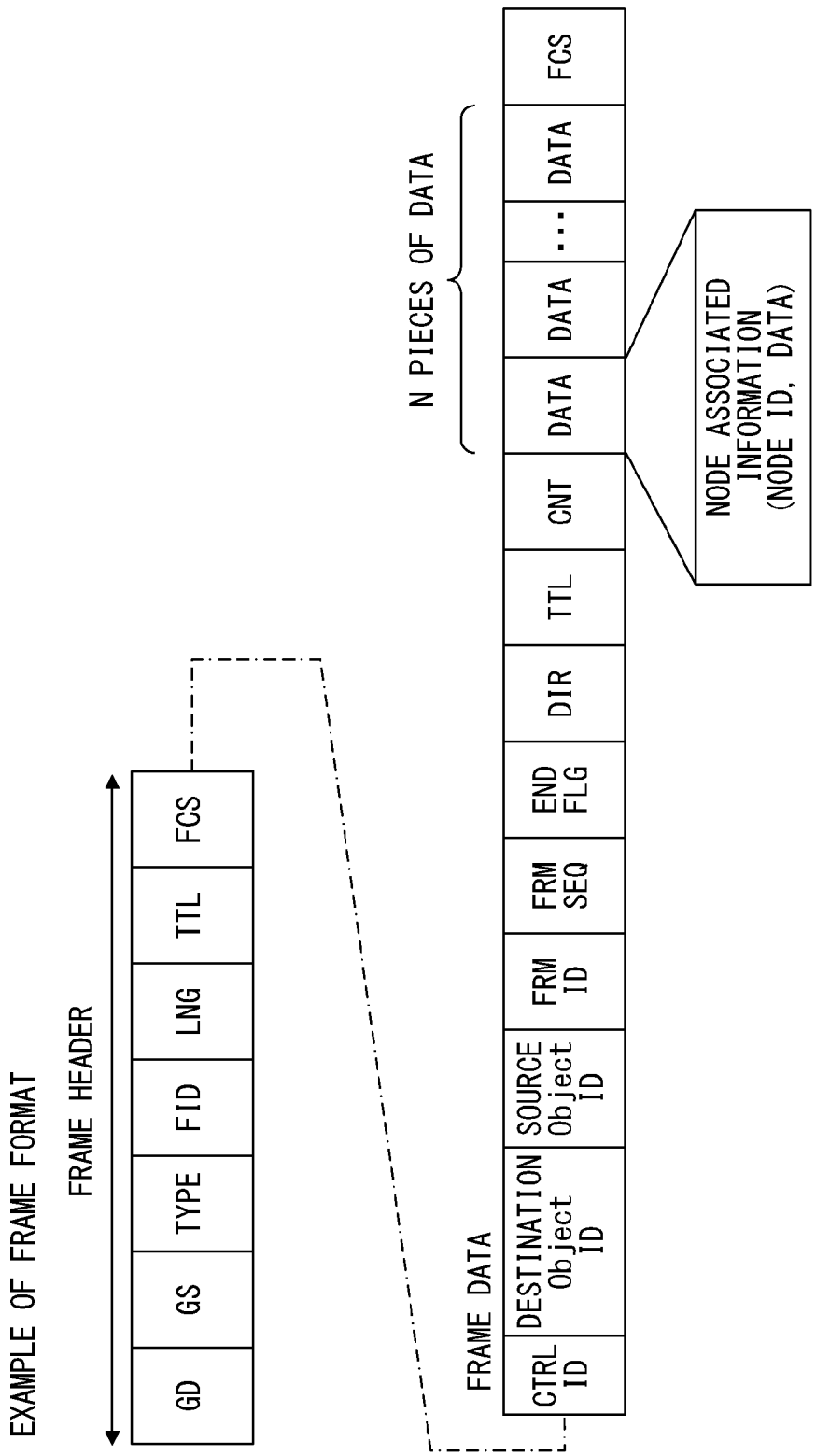
FIG. 7 illustrates an example of a format of a frame transferred between node devices.

FIG. 7 illustrates an example of a format of a frame transferred between node devices 20 (N01 to N11).

In FIG. 7, a frame includes a frame header and frame data. The frame header includes a global destination address (GD), a global source address (GS), a frame type (TYPE), frame identification information (FID), a frame data length (LNG), a frame validity term (TTL) and FCS. The frame may be of a fixed length or a variable length. The frame and the frame header are generated, analyzed and controlled by the communication controlling unit 220.

The global destination address (GD) represents a global destination address of a frame. The global source address (GS) represents a global source address of the frame. The frame type (TYPE) represents a type of the frame, such as maintenance. The frame identification information (FID) represents identification information of the frame. The frame data length (LNG) represents a length of frame data. The frame validity term (TTL) represents the maximum number of transfers or the maximum number of hops of the frame between node devices.

The frame data includes a control identifier (CTRL ID), destination identification information (ObjectID), source identification information (ObjectID), a frame identifier (FRM ID), a frame sequence number (FRMSEQ), an end flag (ENDFLG), a trace direction (DIR), a validity term (TTL), count (CNT), a plurality of collection data areas (DATA), and an FCS field. The frame data may be of a fixed length or a variable length. Contents of the frame data are assembled, generated, edited, analyzed, and controlled by the processor 202. However, one frame may be configured by incorporating, into the frame header, some or all of these fields other than collection data areas in the frame data. The plurality of collection data areas that form one group may be of a variable length. One collection data area including a single piece of node related information when the single piece of node related information has occurred may be formed without securing an empty collection data area that does not include node related information data among collection data areas.

The control identifier (CTRL ID) is a control identifier that represents, for example, a trace request or a trance reply, or an information collection request or an information collection reply as a type of the frame data. The destination identification information (ObjectID) is an object ID of a destination node device of a frame for searching for a path. The source identification information (ObjectID) is an object ID of a source node device of the frame for searching for a path. The frame identifier (FRM ID) is an identifier or an identification number of a frame or frame data. The frame sequence number (FRMSEQ) is a sequence number of a frame or frame data. The end flag (END FLG) represents the last frame data of partitioned frame data if an end flag is set. The trace direction (DIR) represents, as a trace direction (forward FW, return RT), identification information of a node device as a trace starting point and identification information of a node device as a trace end point. When an anomalous result is notified, a value at the beginning of the trace direction (DIR) is set to "8". The validity term (TTL) represents the maximum number of transfers or hops of a frame or frame data between node devices. The count (count value) (CNT) represents a transfer order number of a frame or frame data between node devices. The plurality of collection data areas (DATA) represent identification information (ID) of a node device and collected node related information. The FCS represents a checksum or a sequence of frame data.

Figure 8A:
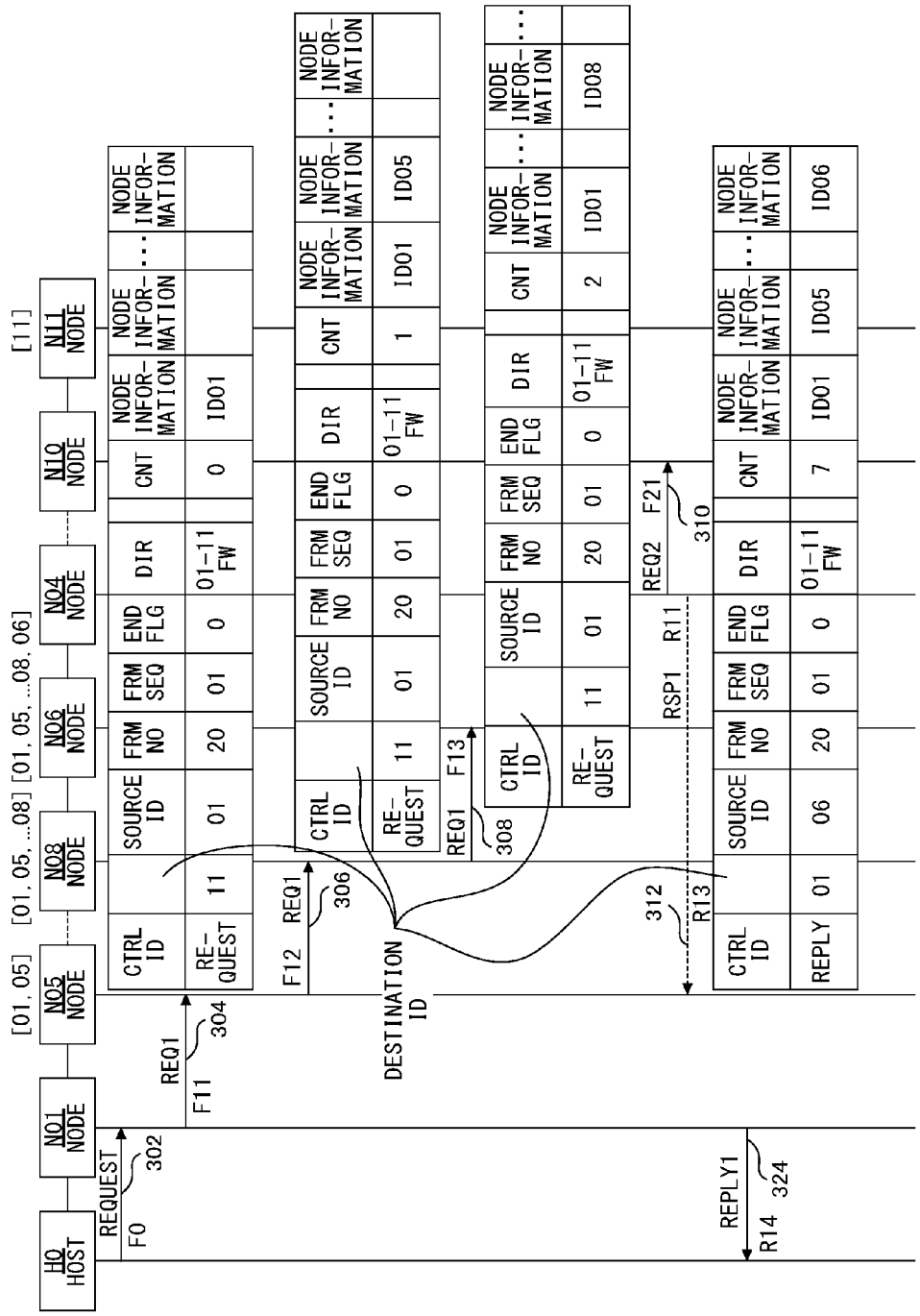
FIG. 8A and FIG. 8B are schematics illustrating an example of a frame process and transfer procedures in the plurality of node devices on the forward path illustrated in FIGS. 1 and 2.
Figure 8B:
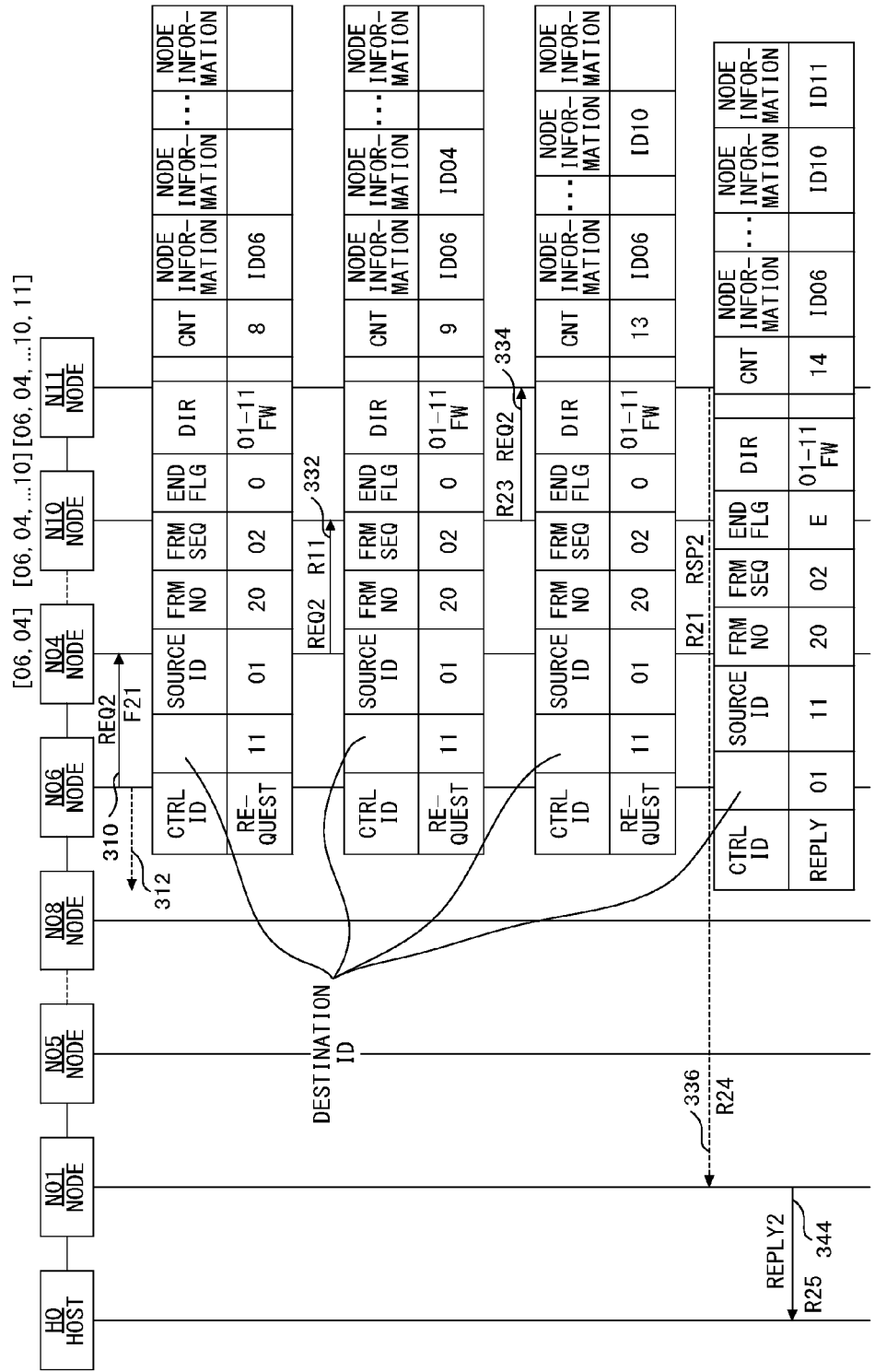

FIGS. 8A and 8B illustrate a frame process and transfer procedures in the plurality of node devices N01, N05, N08, N06, N04, N10 and N11 on the forward path in FIGS. 1 and 2.

Referring to FIG. 8A, the host device H0 feeds a request command F0 that designates a forward path as a trace direction (DIR:01-11) to the node device N01 in step 302.

In step 304, the node device N01 generates the request frame REQ1, and transfers the frame to the node device N05 on the forward link F11. The node device N05 receives the request frame REQ1. The request frame REQ1 (frame data) includes an identifier indicating, for example, a "trace request" or an "information collection request" as a control identifier, the ID "11" of the node device N11 as destination identification information, and the ID "01" of the node device N01 as source identification information. The request frame REQ1 (frame data) includes, for example, a frame number "20" as a frame identifier, and a frame sequence number "01". The request frame REQ1 also includes a value "0" as the end flag indicating that a partitioned frame is not the last, the IDs "01-11" (forward path) of the source node device and the destination node device as a trace direction, a validity term such as "000", and a count "0". The request frame REQ1 further includes the identification information "01" of the source node device N01 and arbitrarily includes other node related information in the first collection data area.

In step 306, the node device N05 adds the identification information "05" of the node device N05 and arbitrarily adds other node related information to the next collection data area of the received request frame REQ1, and transfers the frame to the next node device "N08" on the forward link F12. The node device N08 receives the request frame REQ1. The count within the request frame REQ1 has an incremented value "1".

In step 308, the node device N08 adds the identification information "08" of the node device N08 and arbitrarily adds other node related information to an empty collection data area of the received request frame REQ1, and transfers the frame to the next node device N06 on the forward link F13. The node device N06 receives the request frame REQ1. If the node device N08 is, for example, the sixth node device that has relayed the frame starting to count at the node device N01, the count in the request frame REQ1 has an incremented value "6".

In step S310, the node device N06 determines that there are not empty collection data areas for two pieces of more of node related information within the received request frame REQ1, namely, there is an empty collection data area for only one piece of node related information, or there are no empty collection data areas. The node device N06 generates a partitioned request frame REQ2, and transfers the generated frame to the node device N04 on the forward link F21. The node device N04 receives the partitioned request frame REQ2.

In step 312, the node device N06 generates a partitioned reply frame RSP1, and transmits the generated frame to the source node device N01 of the request frame REQ1 via the plurality of node devices on the return links (R11 to R13).

The partitioned reply frame RSP1 (frame data) includes an identifier indicating, for example, a trace reply or an information collection reply as a control identifier, the ID "01" of the node device N01 as destination identification information, the ID "06" of the node device N06 as source identification information, and a frame sequence number "01". The partitioned reply frame RSP1 also includes a value "0" as the end flag indicating that the partitioned frame is not the last, the IDs "01-11" of the source node device and the destination node device as a trace direction (forward path), and an incremented count "7". The partitioned reply frame RSP1 further includes the identification information "06" of the node device N06 and arbitrarily includes other node related information in the last collection data area.

In step 324, the node device N01 feeds the identification information of the node devices N01, N05, N08 and N06 in the collection data areas included in the partitioned reply frame RSP1 to the host device H0 on the return link R14 as a partitioned reply 1.

Referring to FIG. 8B, in step 310, the request frame REQ2 (frame data) generated by the node device N06 includes a frame sequence number "02" indicating the second partitioned frame, and an incremented count "8". The request frame REQ2 also includes the identification information "06" of the node device N06 and arbitrarily includes other node related information in the first collection data area. The other collection data areas are empty.

In step 332, the node device N04 adds the identification information "04" of the node device N04 and arbitrarily adds other node related information to an empty collection data area of the received request frame REQ2, and transfers the frame to the next node device (N10) on the forward link F22. The node device N10 receives the request frame REQ2.

In step 334, the node device N10 adds the identification information "10" of the node device N10 and arbitrarily adds other node related information to an empty collection data area of the received request frame REQ2, and transfers the frame to the next node device N11 on the forward link F23. The node device N11 receives the reply frame RSP2. If the node device N10 is, for example, the 13th node that has relayed the frame starting to count at the node device N01, the count within the request frame REQ2 has an incremented value "13".

In step 336, the node device N11 determines that the destination identification information of the local node device N11 is the same as that within the received request frame REQ1. The node device N11 generates a partitioned reply frame RSP2, and transmits the reply frame RSP2 to the source node device N01 of the request frame REQ2 via the plurality of node devices on the return links R21 to R24. The reply frame RSP2 (frame data) includes, for example, "a trace reply" or an "information collection reply" as a control identifier, the ID "01" of the node device N01 as destination identification information, and the ID "06" of the node device N11 as source identification number, and a frame sequence number "02". The reply frame RSP2 also includes a value "END" or "1" as the end flag indicating that the partitioned frame is the last, the IDs "01-11" of the source node device and the destination node device as a trace direction (forward path), and an incremented count "14". The reply frame RSP2 further includes the identification information "06" of the node device N06 and arbitrarily includes other node related information in the collection data area.

In step 344, the node device N01 feeds the identification information of the node devices N06, N04, N10 and N11 and the other node related information in the collection data areas included in the partitioned reply frame RSP2 to the host device H0 on a return link R25 as the partitioned reply 2.

Figure 9A:
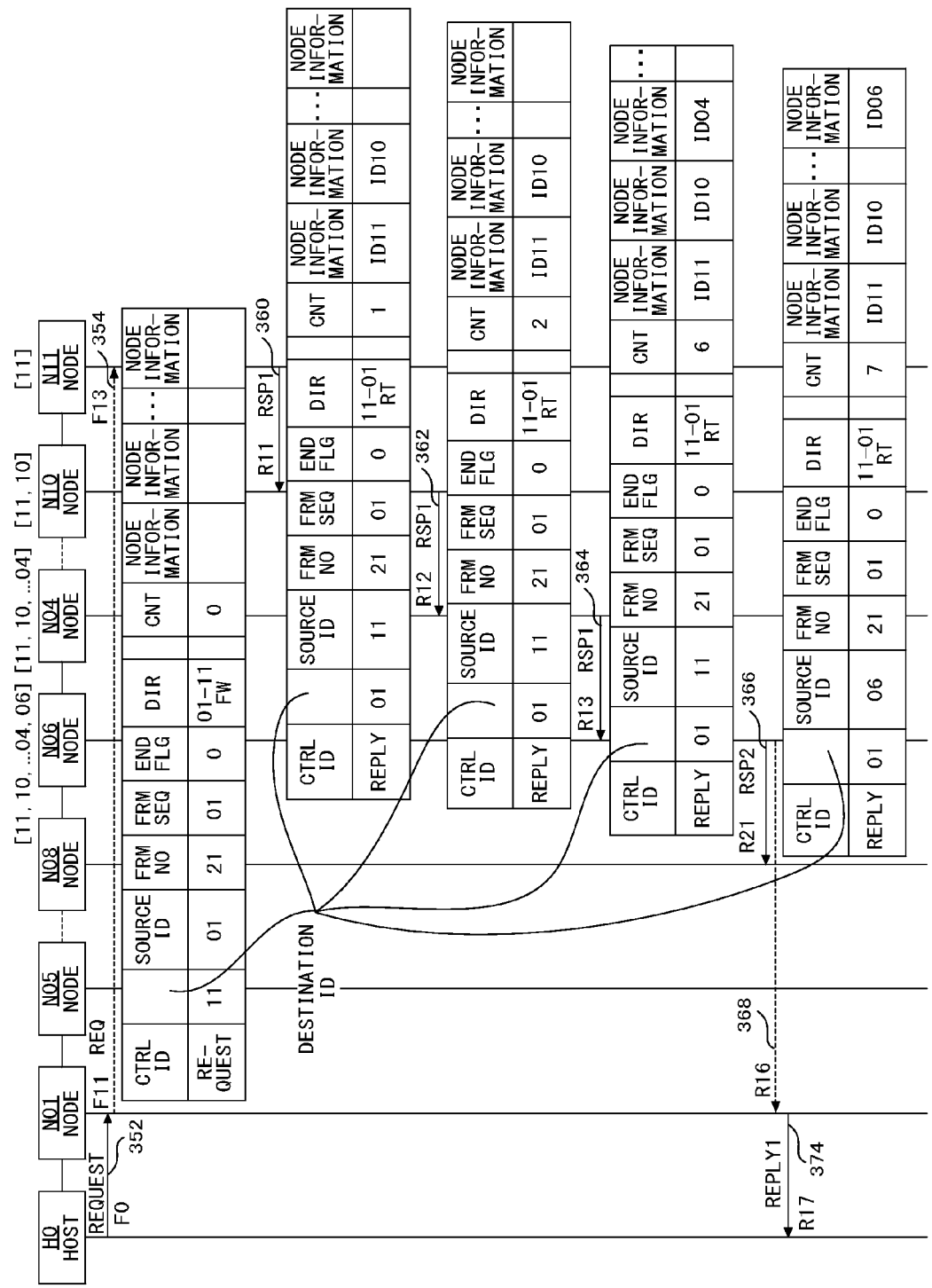
FIG. 9A and FIG. 9B are schematics illustrating an example of a frame process and transfer procedures in a plurality of node devices on the return path illustrated in FIGS. 3 and 4.
Figure 9B:
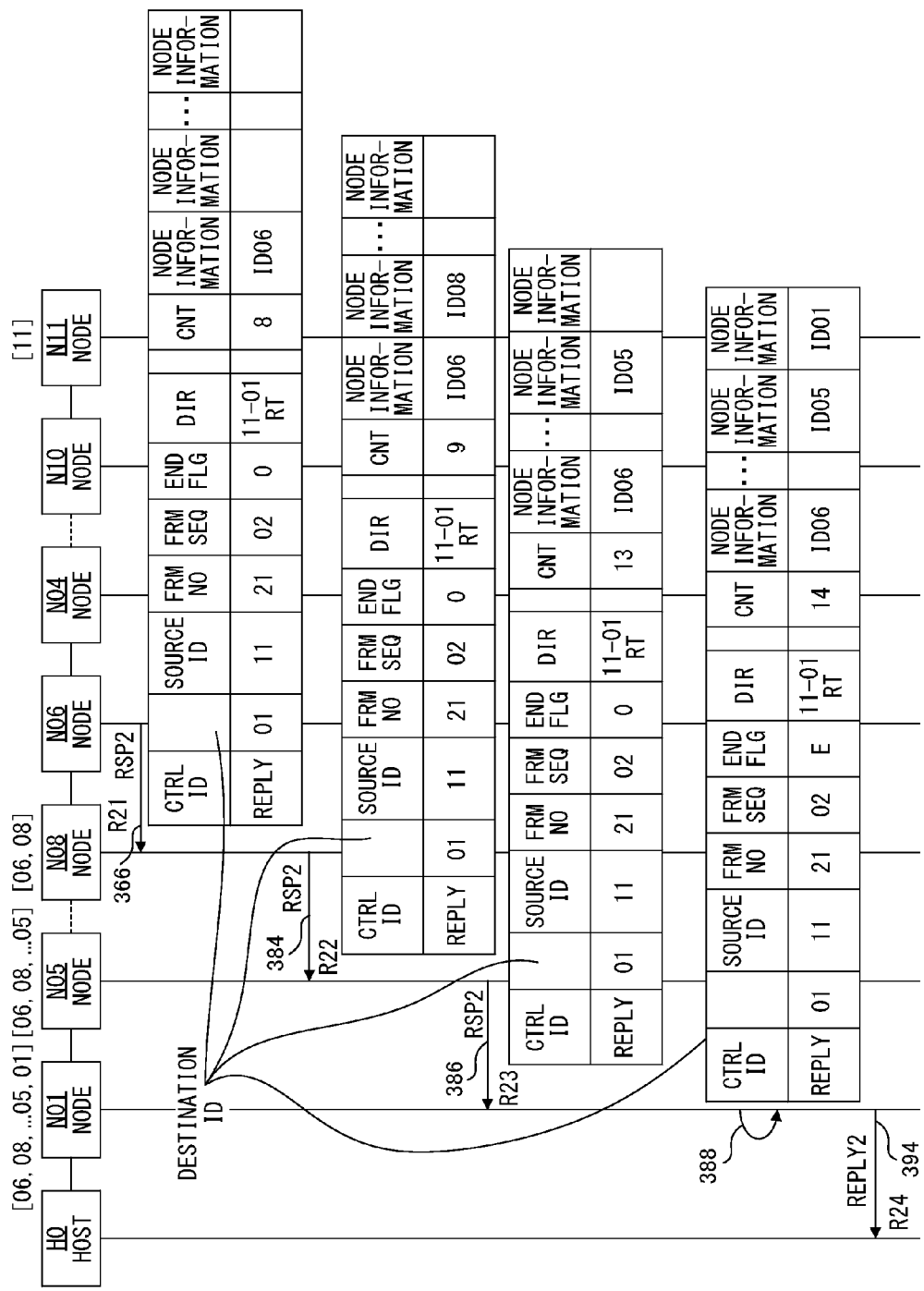

FIGS. 9A and 9B illustrate an example of a frame process and transfer procedures in the plurality of node devices N11, N10, N04, N06, N08, N05 and N01 on the return path illustrated in FIGS. 3 and 4.

Referring to FIG. 9A, the host device H0 feeds the request command F0 that designates a trace direction (DIR: 11-01) as the return path to the node device N01.

In step 354, the node device N01 generates a request frame REQ, and transmits the generated request frame REQ to the destination node device N11 via the plurality of node devices via the forward links (F11 to F13). The request frame REQ (frame data) includes, for example, an identifier indicating "a trace request" or an "information collection request" as a control identifier, the ID "11" of the node device N11 as destination identification information, and the ID "01" of the node device N01 as source identification number. The request frame REQ also includes, for example, a frame number "21", and a frame sequence number "01" as a frame identifier. The request frame REQ further includes a value "0" as the end flag indicating that the partitioned frame is not the last, the IDs "11-01" of the destination node device and the source node device as a trace direction (return path), a validity term such as "999", and a count "0". The request frame REQ does not include data in collection data areas.

In step 360, the node device N11 receives the request frame REQ, and determines that the destination identification information of the local node device N11 is the same as the destination identification information within the received request frame REQ. The node device N11 generates a reply frame RSP1, and transfers the generated frame to the node device N10 on the return link R11. The node device N10 receives the reply frame RSP1.

The reply frame RSP1 (frame data) includes, for example, an identifier indicating a "trace reply" or an "information collection reply" as a control identifier, the ID "01" of the node device N01 as destination identification information, and the ID "11" of the node device N11 as source identification information. The reply frame RSP1 also includes, for example, a frame number "21" as a frame identifier, and a frame sequence number "01". The reply frame RSP1 further includes a value "0" as the end flag indicating that the partitioned frame is not the last, the IDs "01-11" of the source node device and the destination node device as a trace direction (return path), a validity term such as "999", and a count "0". The reply frame RSP1 further includes the identification information "11" of the node device N11 and arbitrarily includes other node related information in the first collection data area.

In step 362, the node device N10 adds the identification information "10" of the node device N10 and arbitrarily adds other node related information to the next collection data area of the received reply frame RSP1, and transfers the frame to the next node device (N04) on the return link R12. The node device N04 receives the reply frame RSP1. The count in the request frame REQ1 has an incremented value "1".

In step 364, the node device N04 adds the identification information "08" of the node device N08 and arbitrarily adds other node related information to an empty collection data area of the received reply frame RSP1, and transfers the frame to the next node device N06 on the forward link R13. The node device N06 receives the reply frame RSP1. If the node device N04 is the sixth node device that has relayed the frame starting to count at the node device N11, the count within the reply frame RSP1 has an incremented value "6".

In step 366, the node device N06 determines that there are no empty collection data areas for two pieces or more of node related information within the received reply frame RSP1. The node device N06 generates a partitioned reply frame RSP2, and transfers the generated frame to the next node device N08 on the return link R21.

In step 368, the node device N06 adds the identification information "06" of the node device N06 and arbitrarily adds other node related information to the last collection data area of the received reply frame RSP1, and updates the reply frame as a partitioned reply frame RSP1. The reply frame RSP1 is transferred to the destination node device N01 via the plurality of node devices (N14 to N05) on the return links (R14 to R16). In the reply frame RSP1, node related information of the node devices (N14 to N01) is not added on the return path because there are no empty collection data areas. The reply frame RSP1 (frame data) includes, for example, an identifier indicating a "trace reply" or an "information collection reply" as a control identifier, the ID "01" of the node device N01 as destination identification information, the ID "06" of the node device N06 as source identification information, and a frame sequence number "01". The reply frame RSP1 also includes, for example, a value "0" as the end flag indicating that the partitioned frame is not the last, the IDs "11-01" of the destination node device and the source node device as a trace direction (return path), and an incremented count "7".

In step 374, the node device N01 feeds the identification information of the node devices N11, N10, N04 and N06 in the collection data areas and other node related information, which are included in the reply frame RSP1, to the host device H0 on the return link R17 as a partitioned reply 1.

Referring to FIG. 9B, in step 366, the request frame REQ2 (frame data) generated by the node device N06 includes a frame sequence number "02" indicating the second partitioned frame, and an incremented count "8". The partitioned reply frame RSP2 also includes the identification information "06" of the node device N06 and arbitrarily includes other node related information in the first collection data area. The other collection data areas are empty.

In step 384, the node device N08 adds the identification information "08" of the node device N08 and arbitrarily adds other node related information to an empty collection data area of the received request frame REQ2, and transfers the frame to the next node device (N05) on the return link R22. The node device N05 receives the request frame REQ2.

In step 386, the node device N05 adds the identification information "05" of the node device N05 and arbitrarily adds other node related information to an empty collection data area of the received request frame REQ2, and transfers the frame to the next node device N01 on the forward link R23. The node device N01 receives the reply frame RSP2. If the node device N05 is, for example, the 13th node device starting to count at the node device N11, the count within the reply frame RSP2 has an incremented value "13".

In step 388, the node device N01 determines that the destination identification information of the local node device N01 is the same as that within the received reply frame RSP2. The node device N01 adds the identification information "01" of the node device N01 and arbitrarily adds other node related information to an empty collection data area of the received request frame REQ2.

The reply frame RSP2 (frame data) includes, for example, an identifier indicating a "trace reply" or an "information collection reply" as a control identifier, the ID "01" of the node device N01 as destination identification information, the ID "11" of the node device N11 as source identification information, and a frame sequence number "02". The reply frame RSP 2 also includes a value "END" or "1" as the end flag indicating that the partitioned frame is the last, the IDs "01 to 11" of the source node device and the destination node device as a trace direction (forward path), and an incremented count "14". The reply frame RSP2 further includes the identification information "N01" of the node device N01 and arbitrarily includes other node related information in the last collection data area.

In step 394, the node device N01 feeds the identification information of the node devices N06, N08, N05 and N01 and other node related information, which are included in the collection data areas within the reply frame RSP2, to the host device H0 on the return link R25 as a partitioned reply 2.

Figure 10:
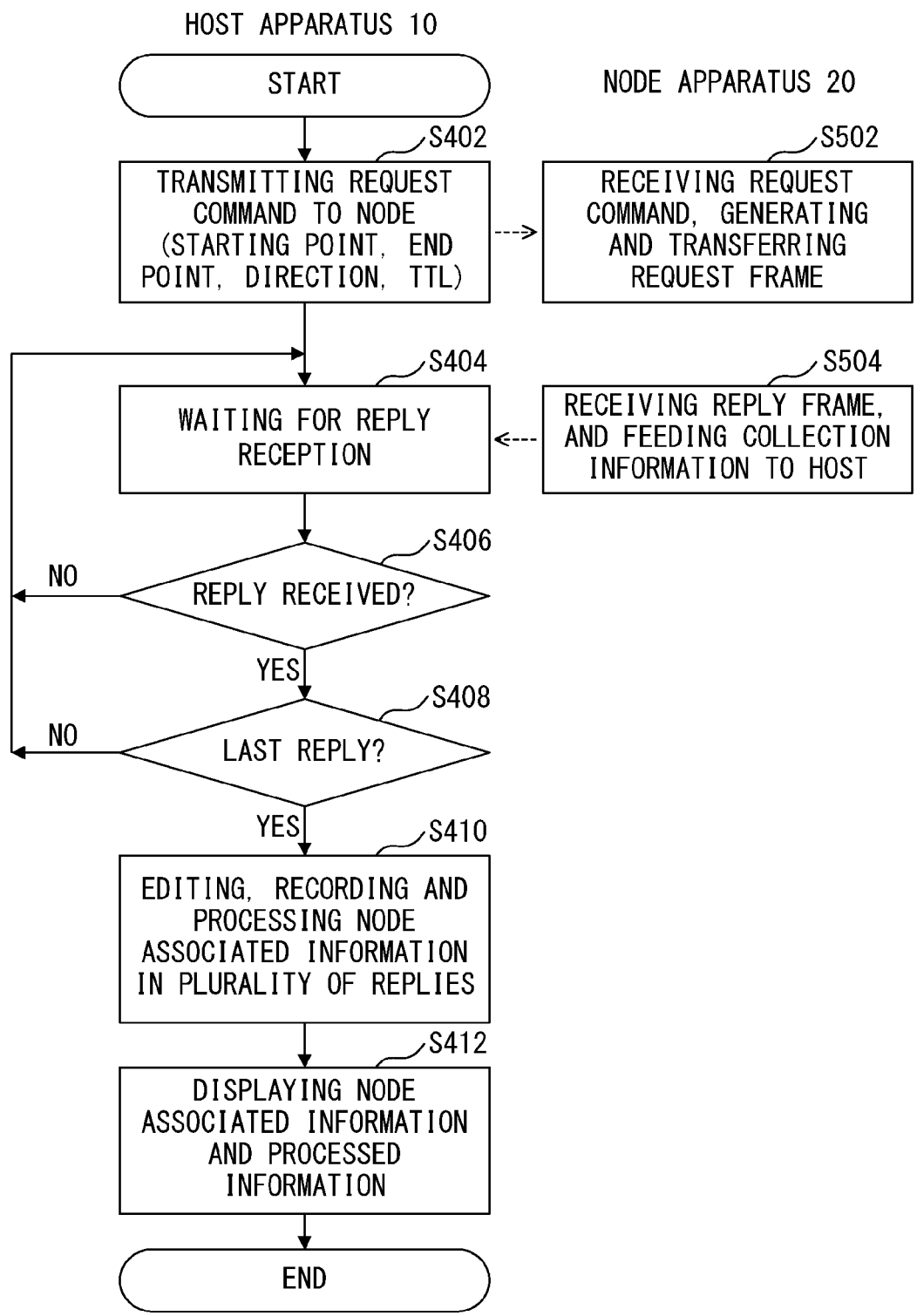
FIG. 10 illustrates an example of a flowchart for transmitting a request command and for receiving a reply performed by the host device.

FIG. 10 illustrates an example of a flowchart for transmitting a request command and for receiving a reply by the host device 10.

Referring to FIG. 10, in step 402, a processor 102 of the host device 10 generates an information collection request command according to an operation of the input device 112 performed by an administrator or a user. The request command may be, for example, a trace request to trace a transfer path of a frame, or an information collection request to request collection of information related to node devices on a transfer path. The communication controlling unit 120 controls the transmitting unit 1222 of the communication card 122 so that the request command is transmitted to the node device 20 (N01) connected to the host device 10. The request command includes, for example, items such as identification information (for example, "01" or "11") of a starting point node device, identification information (for example, "11" or "01") of an end point node device, a trace or path direction ("01-11" or "11-01"), and a validity term (for example, TTL="999"). These items are read from the memory 116 and/or the hard disk drive 118.

The processor 202 in the node device 20 receives the request command from the host device 10 via the interface 210 in step 502. The processor 202 edits and generates data of a trace request frame or an information collection request frame in response to the request command, and feeds the data to the communication controlling unit 220. The communication controlling unit 220 generates a frame header for the data according to control and routing rules within the storing unit 221. Moreover, the communication controlling unit 220 generates a request frame including the frame header and the data, and controls the transmitter 2222 of one of the communication cards 222 to 228 to transmit the request frame to an adjacent node device according to control and routing rules.

In step 404, the processor 102 waits for reply reception from the node device 20 (N01) with the communication controlling unit 120 and the communication card 122.

In step 504, the receiver 2224 of the communication cards 222 to 228 in the node device 20 (N01) sequentially receives a plurality of partitioned reply frames under a control of the communication controlling unit 220. The communication cards 222 to 228 sequentially receive the plurality of reply frames from the receiver 2224 via the communication controlling unit 220, respectively extract frame data from the reply frames, and sequentially feed the extracted data to the processor 202. The processor 202 forms one or a plurality of replies by extracting collection data from the frame data, and feeds the one or the plurality of replies to the host device 10 via the interface 210.

In step 406, the processor 102 determines whether or not a reply has been received. If the processor 120 determines that the reply has not been received, the flow goes back to step 404. If the processor 102 determines that the reply has been received, the flow goes to step 408.

In step 408, the processor 102 determines whether or not the received reply is the last one. If the processor 102 determines that the received reply is not the last one, the flow goes back to step 404. If the processor 102 determines that the received reply is the last one, the flow goes to step 410.

In step 410, the processor 102 links or combines, records and processes node related information of the plurality of received partitioned replies. The combined identification information of the node devices represents node devices on a transfer path of a request frame or a reply frame. The combined node related information also represents node related information of the node devices on the transfer path of the request frame or the reply frame.

In step 412, the processor 102 displays the collected and processed node related information and the processed information on the display device 114, for example, as maintenance information for maintaining the system including the plurality of node devices 20 (N01 to N11).

FIGS. 11A to 11D illustrate an example of a flowchart for receiving and transferring a request frame and a reply frame by each of the node devices 20 (N01 to N11).

Referring to FIG. 11A, in step 506, the processor 202 of the node device 20 determines whether or not the communication cards 222 to 228 receive a new frame via the communication controlling unit 220 according to firmware and/or middleware of the storing unit 20 or a program stored in the storing unit 206. Step 506 is repeated until the new frame is received. If the processor 202 determines that the new frame has been received, the flow goes to step 508.

In step 508, the processor 202 receives the frame via the communication controlling unit 220. The processor 202 determines whether or not the received frame is a request frame (such as a trace request frame or an information collection request frame) by referencing a control identifier within the data of the received frame. If the processor 202 determines that the received frame is the request frame, the flow goes to step 510. If the processor 202 determines that the received frame is not the request frame, namely, the received frame is a reply frame (such as a trace reply frame or an information collection reply frame), the flow goes to step 602.

In step 602, the processor 202 determines whether or not destination identification information (ID) within the data of the received frame is the same as identification information (ID) of the local node device 20. If the processor 202 determines that the destination identification information is not the same as the identification information of the local node device 20, the flow goes to step 612 of FIG. 11D.

If determining that the destination identification information is the same as the identification information of the local node device 20, the processor 202 extracts collected node related information from collection data areas of the reply frame, edits the information, and feeds the edited information to a higher-order device (host device 10) as a reply. Thereafter, the flow exits a subroutine of FIG. 11A, or goes back to step 506 of FIG. 11A.

In step 510, the processor 202 determines whether or not the validity term TTL of the frame data is larger than 0, namely, whether or not the validity term exists. If the processor 202 determines that the validity term is not larger than 0, namely, the validity term is 0, the flow goes to step 512. If the processor 202 determines that the validity term is larger than 0, the flow goes to step 522.

In step 512, the processor 202 discards the data of the received frame, and causes the communication controlling unit 120 to discard the received frame. Thereafter, the flow exits the subroutine of FIG. 11A, or goes back to step 506 of FIG. 11A.

In step 522, the processor 202 decrements the validity term TTL (TTL=TTL−1) within the frame data. The communication controlling unit 220 decrements the validity term TTL (TTL=TTL−1) within the frame header. In step 524, the processor 202 determines whether or not destination identification information (ID) within the frame data is the same as the identification information of the local node device. If the processor 202 determines that the destination identification information is not the same as the identification information of the local node device, the flow goes to step 532 of FIG. 11B. Alternatively, if the processor 202 determines that the destination identification information is the same as the identification information of the local node device, the flow goes to step 582 of FIG. 11C.

Figure 11B:
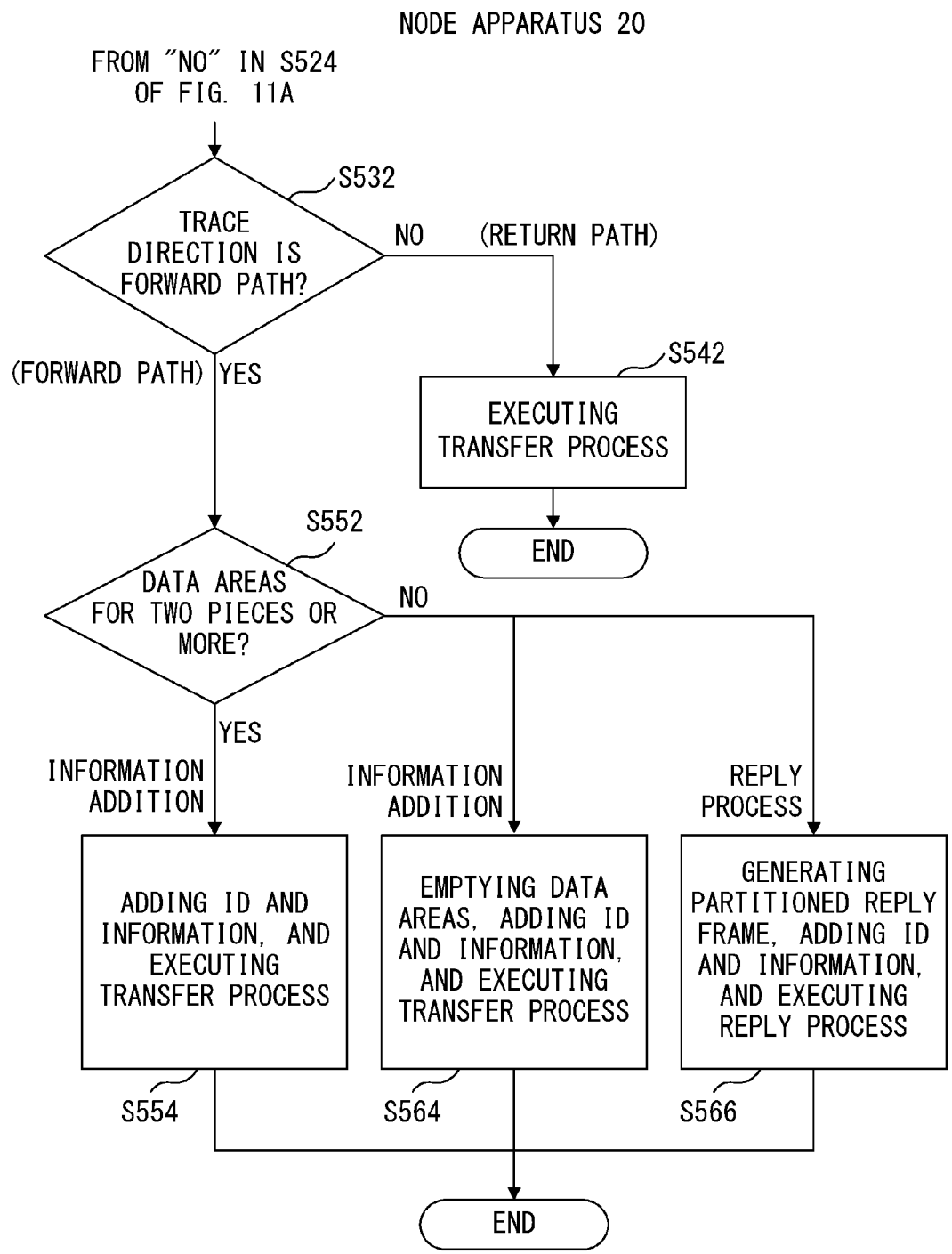

Referring to FIG. 11B, in step 532, the processor 202 determines whether or not the trace direction (DIR) within the frame data is a forward path. If the processor 202 determines that the trace direction is not the forward path, namely, the trace direction is a return path, the flow goes to step 542. Alternatively, if the processor 202 determines that the trace direction is the forward path, the flow goes to step 552.

In step 542, the processor 202 executes a transfer process for the received frame. Namely, the processor 202 causes the communication controlling unit 220 and any one of the communication cards 222 to 228 to transfer the received frame to the next node device on the return path after updating the validity term TTL without adding node related information to a collection data area of the frame data. The communication controlling unit 220 causes the communication cards 222 to 228 (the transmitter 2222) to transfer the received frame to the next node device on the return path after updating the frame header of the received frame according to control and routing rules within the storing unit 221. Thereafter, the flow exits a subroutine of FIG. 11B, or goes back to step 506 of FIG. 11A.

In step 552, the processor 202 determines whether or not there are empty collection data areas for two pieces of more of node related information within data of the received request frame. If the processor 202 determines that there are empty collection data areas for two pieces or more, the flow goes to step S554. Alternatively, if the processor 202 determines that there are not empty collection data areas for two pieces or more, the flow goes to steps 564 and 566.

In step 554, the processor 202 updates the request frame by adding the identification information (ID) of the node device 20 and arbitrarily adding other node related information, which are extracted from the storing unit 206, to an empty collection data area within the data of the received request frame. Next, the processor 202 causes the communication controlling unit 220 and one of the communication cards 222 to 228 to transfer the updated request frame to the next node device on the forward path. The communication controlling unit 220 updates the frame header of the request frame according to control and routing rules within the storing unit 221, and causes the communication cards 222 to 228 (the transmitter 2222) to transfer the request frame to the next node device on the forward path.

In step 564, the processor 202 empties or deletes all the collection data areas within the data of the received request frame, and increments the frame sequence number (FRM_SEQ=FRM_SEQ+1). Next, the processor 202 updates the request frame to a partitioned request frame by adding the identification information (ID) of the local node device and arbitrarily adding other node related information, which are extracted from the storing unit 206, to the first collection data area of the data within the request frame. The processor 202 causes the communication controlling unit 220 and one of the communication cards 222 to 228 to transfer the partitioned request frame to the next node device on the forward path. The communication controlling unit 220 updates the frame header of the partitioned request frame according to control and routing rules within the storing unit 221, and causes the communication cards 222 to 228 (the transmitter 2222) to transfer the request frame to the next node device on the forward path.

In step 566, the processor 202 generates a partitioned reply frame based on the received request frame, copies node related information in collected data areas of the received request frame to collection data areas of the reply frame, adds the identification information (ID) of the local node device 20 and arbitrarily adds other node related information, which are extracted from the storing unit 206, to a remaining collection data area. Next, the processor 202 causes the communication controlling unit 220 and one of the communication cards 222 to 228 to transfer the partitioned reply frame to the next node device on the return path. The communication controlling unit 220 updates or forms the frame header of the reply frame according to control and routing rules within the storing unit 221, and causes the communication cards 222 to 228 (the transmitter 2222) to transfer the reply frame to the next node device on the return path.

After steps 554, 564 and 566, the flow exits the subroutine of FIG. 11B, or goes back to step 506 of FIG. 11A.

Figure 11C:
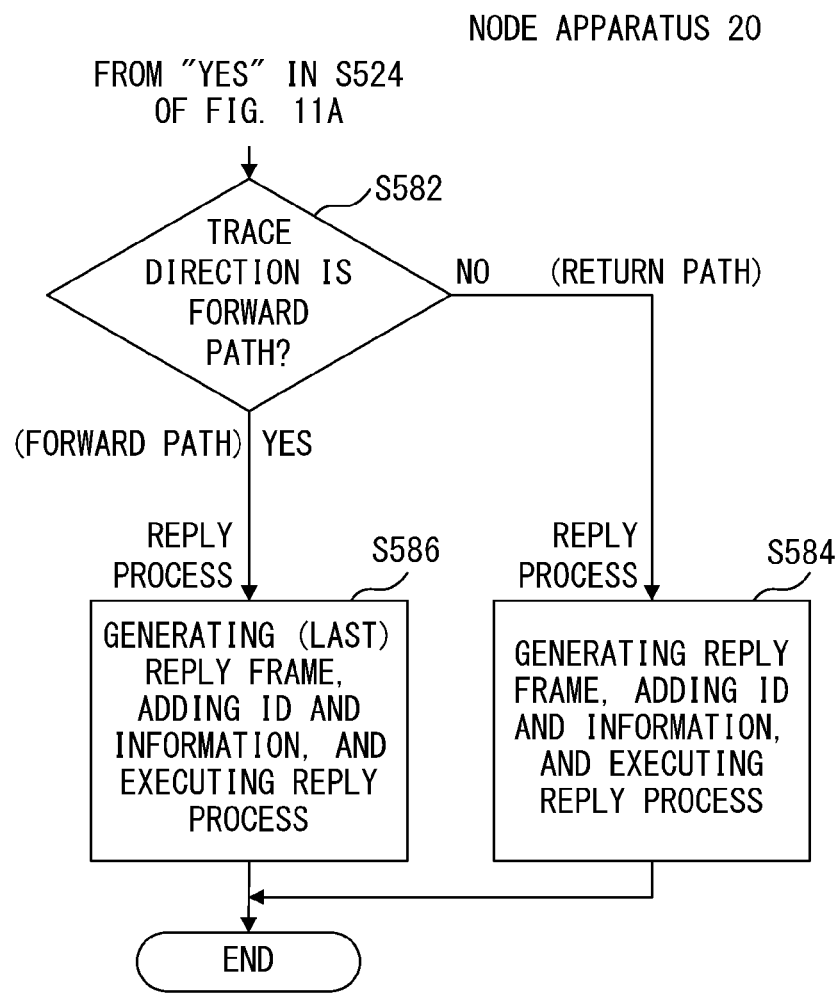

Referring to FIG. 11C, in step 582, the processor 202 determines whether or not the trace direction within the frame data is a forward path. If the processor 202 determines that the trace direction is not the forward path, namely, the trace direction is a return path, the flow goes to step 584. Alternatively, if the processor 202 determines that the trace direction is the forward path, the flow goes to step 586.

In step 584, the processor 202 generates the first reply frame based on the received request frame, sets the end flag to 0, and adds the identification information (ID) of the local node device 20 and other node related information, which are extracted from the storing unit 206, to the first empty collection data area among a plurality of collection data areas. Next, the processor 202 causes the communication controlling unit 220 and one of the communication cards 222 to 228 to transfer the reply frame to the next node device on the return path. The communication controlling unit 220 forms or updates the frame header of the reply frame according to control and routing rules within the storing unit 221, and causes the communication cards 222 to 228 (the transmitter 2222) to transfer the reply frame to the next node device on the return path.

In step 586, the processor 202 generates the last partitioned reply frame based on the received request frame, sets the end flag (END) to "1", copies the node related information in the collection data areas of the received request frame to collection data areas of the reply frame, and adds the identification information (ID) of the node device 20 and the other node related information, which are extracted from the storing unit 206, to an empty collection data area. Next, the processor 202 causes the communication controlling unit 220 and one of the communication cards 222 to 228 to transfer the partitioned reply frame to the next node device on the return path. The communication controlling unit 220 forms or updates the frame header of the reply frame according to control and routing rules within the storing unit 221, and causes the communication cards 222 to 228 (the transmitter 2222) to transfer the reply frame to the next node device on the return path.

After steps 584 and 586, the flow exits a subroutine of FIG. 11C, or goes back to step 506 of FIG. 11A.

Figure 11D:
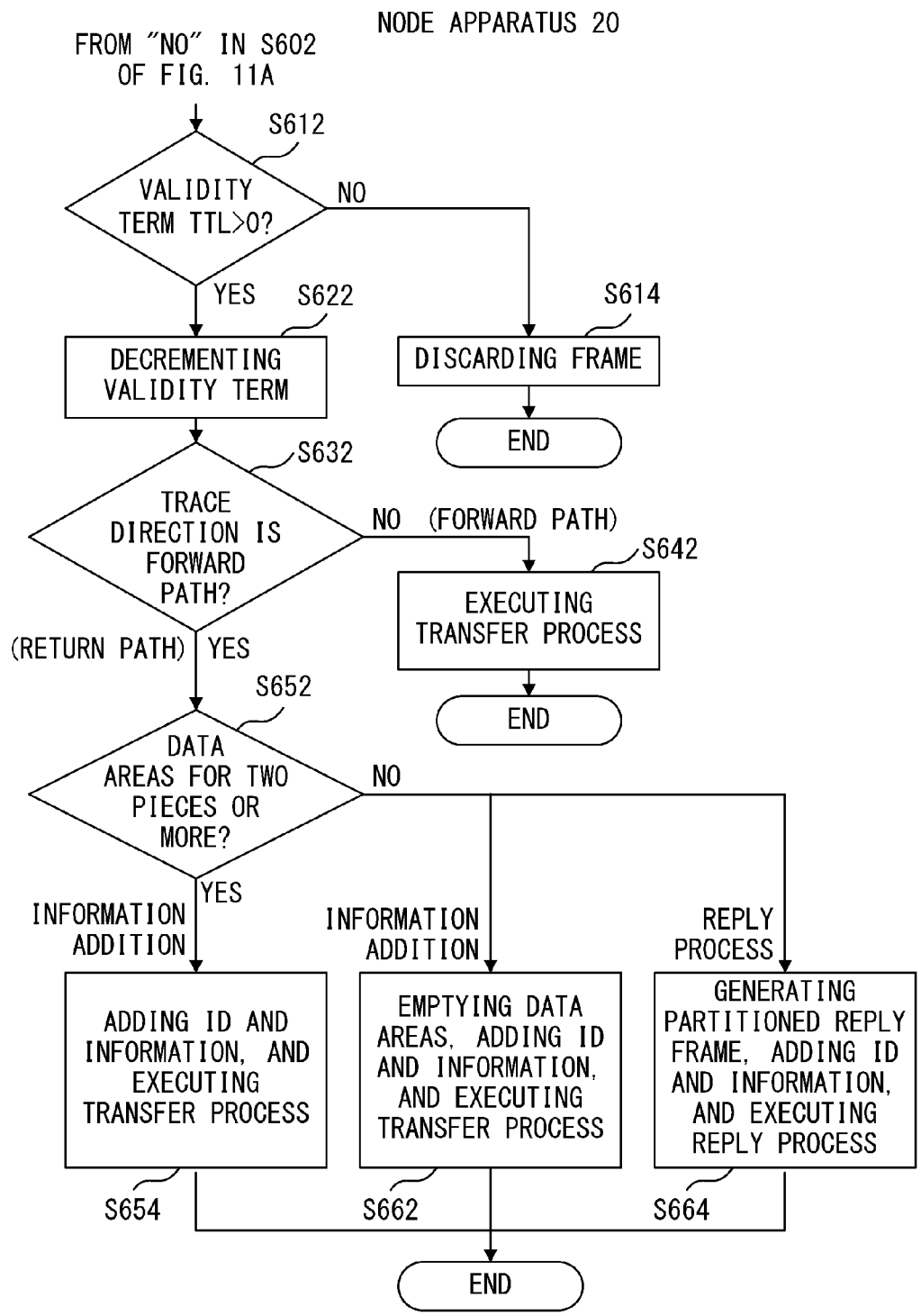

Referring to FIG. 11D, in step 612, the processor 202 determines whether or not the validity term TTL within the frame data is larger than 0, namely, whether or not the validity term TTL exists. If the processor 202 determines that the TTL is not larger than 0, namely, the TTL is 0, the flow goes to step 614. If the validity term is larger than 0, the flow goes to step 622.

In step 614, the processor 202 discards the data of the received frame, and causes the communication controlling unit 120 to discard the received frame. Thereafter, the flow exits a subroutine of FIG. 11D, or goes back to step 506 of FIG. 11A.

In step 622, the processor 202 decrements the validity term TTL (TTL=TTL−1) within the frame data. The communication controlling unit 220 decrements the validity term TTL (TTL=TTL−1) within the frame header. In step 632, the processor 202 determines whether or not the trace direction within the frame data is a forward path. If the processor 202 determines that the trace direction is not the forward path, namely, the trace direction is a return path, the flow goes to step 642. Alternatively, if the processor 202 determines that the trace direction is the forward path, the flow goes to step 652.

In step 642, the processor 202 executes a transfer process for the received frame. Namely, the processor 202 updates the validity term TTL without adding node related information to a collection data area of the frame data, and causes the communication controlling unit 220 and one of the communication cards 222 to 228 to transfer the received frame to the next node device on the forward path. The communication controlling unit 220 updates the frame header of the received frame according to control and routing rules within the storing unit 221, and causes the communication cards 222 to 228 (the transmitter 2222) to transfer the received frame to the next node device on the forward path. Thereafter, the flow exits the subroutine of FIG. 11D, or goes back to step 506 of FIG. 11A.

In step 652, the processor 202 determines whether or not there are empty collection data areas for two pieces or more of node related information within the data of the received request frame. If the processor 202 determines that there are empty collection data areas for two pieces or more, the flow goes to step 654. Alternatively, if the processor 202 determines that there are no empty collection data areas for two pieces or more, the flow goes to steps 662 and 664.

In step 654, the processor 202 updates the reply frame by adding the identification information (ID) of the node device 20 and arbitrarily adding other node related information, which are extracted from the storing unit 206, to a collection data area within the data of the received reply frame. Next, the processor 202 causes the communication controlling unit 220 and one of the communication cards 222 to 228 to transfer the updated reply frame to the next node device on the return path. The communication controlling unit 220 updates the frame header of the reply frame according to control and routing rules within the storing unit 221, and causes the communication cards 222 to 228 (the transmitter 2222) to transfer the reply frame to the next node device on the return path.

In step 662, the processor 202 empties or deletes all the collection data areas within the data of the received reply frame, and increments the frame sequence number (FRM_SEQ=FRM_SEQ+1). Next, the processor 202 updates the reply frame to a partitioned reply frame by adding the identification information (ID) of the local node device 20 and arbitrarily adding other node related information, which are extracted from the storing unit 206, to the first collection data area of the data within the reply frame. The processor 202 causes the communication controlling unit 220 and one of the communication cards 222 to 228 to transfer the partitioned reply frame to the next node device on the return path. The communication controlling unit 220 updates the frame header of the partitioned reply frame according to control and routing rules within the storing unit 221, and causes the communication cards 222 to 228 (the transmitter 2222) to transfer the reply frame to the next node device on the return path.

In step 664, the processor 202 generates a partitioned reply frame based on the received reply frame, copies node related information of the collection data areas of the received request frame to collection data areas of the generated reply frame, adds the identification information (ID) of the local node device 20 and arbitrarily adds other node related information, which are extracted from the storing unit 206, to a remaining collection data area. Next, the processor 202 causes the communication controlling unit 220 and one of the communication cards 222 to 228 to transfer the partitioned reply frame to the next node device on the return path. The communication controlling unit 220 updates or forms the frame header of the reply frame according to control and routing rules within the storing unit 221, and causes the communication cards 222 to 228 (the transmitter 2222) to transfer the reply frame to the next node device on the return path.

According to the above described embodiments, information associated with communication node devices can be collected with no degradation of a throughput due to an increase in collection data and with no limitations imposed on the number of hops when the information associated with the communication node devices on a transfer path of a frame having an arbitrary data size is collected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system, including a plurality of node devices that form an ad hoc network, for collecting node related information of node devices on a transfer path of frame data, each of the plurality of node devices comprising:
   a storing unit to store node related information including identification information of the node device,
   a data processing unit to process frame data, and
   a communication controlling unit to receive first frame data including identification information of a source node device and a destination node device from a different node device among the plurality of communication node devices, wherein
   if node related information of two or more node devices can be additionally stored in the received first frame data, the data processing unit updates the received first frame data by adding the node related information stored in the storing unit, and the communication controlling unit transfers the updated first frame data to a different node device among the plurality of communication node devices; and
   if node related information of only one node device can be additionally stored in the received first frame data, the data processing unit generates second frame data including the identification information of the source node device or the identification information of the destination node device as destination identification information, the node related information within the received first frame data, and the node related information, stored in the storing unit of the node device, and also generates third frame data that does not include the node related information within the received first frame data, and the communication controlling unit respectively transfers the generated second frame data and the third frame data to a different node device among the plurality of communication node devices,
   wherein in the node device as the destination node device among the plurality of node devices:
   the communication controlling unit receives fourth frame data transferred by a different node device among the plurality of node devices,
   the data processing unit generates fifth frame data including the identification information of the source node device as destination identification information, node related information within the received fourth frame data, and node related information, stored in the storing unit of the destination node device, and the communication controlling unit transfers the generated fifth frame data to a different node device among the plurality of node devices, and wherein in the node device as the source node device among the plurality of node devices, the communication controlling unit receives the second frame data from a different node device among the plurality of node devices, and the data processing unit extracts, from the received second frame data, a plurality of pieces of node related information that form one group, and feeds the node related information of the one group to a higher-order device connected to the source node device.

2. The system according to claim 1, wherein
in the node device as the source node device among the plurality of node devices,
the data processing unit generates the first frame data including the identification information, stored in the storing unit, of the source node device and the destination node device, and
the communication controlling unit transmits the first frame data to a different node device among the plurality of node devices.

3. The system according to claim 1, wherein
the communication controlling unit transfers frame data in an ad hoc mode, and
the first frame data is request frame data generated by the source node device.

4. The system according to claim 1, wherein
the communication controlling unit transfers frame data in an ad hoc mode, and
the first frame data is reply frame data generated by the source node device in response to request frame data including the identification information of the destination node device as source identification information.

5. The system according to claim 1, wherein the higher-order device generates information about a transfer path of frame data by combining identification information of node related information of a plurality of groups, which are received from the source node device, and displays the generated information about the transfer path on a display device of the higher-order device.

6. The system according to claim 1, wherein the fourth frame data is the third frame data updated by a different node device among the plurality of node devices, or different frame data derived from the third frame data generated by a different node device among the plurality of node devices.

7. The system according to claim 1, wherein data areas for storing a plurality of pieces of node related information that form one group are secured in each piece of the frame data.

8. A system for collecting node related information of a plurality of communication node devices on a transfer path of frame data transmitted from one communication node device in an ad hoc network including the plurality of communication node devices, each of the plurality of communication node devices comprising:

a communication controlling unit to receive frame data from a different communication node device among the plurality of communication node devices, and to transmit adjusted frame data, a storing unit to store the received frame data, and node related information including identification information of the communication node device, and a data processing unit:

to determine whether or not destination identification information included in the received frame data is the same as the identification information of a local communication node device operating as a destination node device, to return the frame data to a source node device via the communication controlling unit after replacing source identification information with the destination identification information and adding the node related information stored in the storing unit of the local communication node device, if the destination identification information is the same as the identification information of the local communication node device, or to determine whether or not the node related information of the local communication node device can be added to the received frame data if the destination identification information is different from the identification information of the local node device, to transfer the frame data to a different communication node device among the plurality of communication node devices via the communication controlling unit after adding the node related information of the local communication node device if the node related information of the local communication node device can be added, or to return the received frame data to the source node device via the communication controlling unit, to generate new frame data by setting a source, a destination and the node related information of the communication node device, and to cause the communication controlling unit to transmit the new frame data to a different communication node device among the plurality of communication node devices if the node related information of the local communication node device cannot be added, and to extract, when the local communication node device is operating as the source node device and receives the frame data from a different node device among the plurality of communication node devices, from the received frame data, a plurality of pieces of node related information that form one group, and to feed the node related information of the one group to a higher-order device connected to the local communication node device.

9. The node device according to claim 8, wherein the communication controlling unit variably decides a transfer destination of frame data so that the node device operates in the ad hoc mode.

10. A node device connectable to an ad hoc network, comprising:

a storing unit to store node related information including identification information of the node device;

a data processing unit to process frame data; and a communication controlling unit to receive first frame data including identification information of a source node device and a destination node device from a different node device on the network, wherein if node related information of two or more node devices can be additionally stored in the received first frame data, the data processing unit updates the received first frame data by adding the node related information stored in the storing unit, and the communication controlling unit transfers the updated first frame data to a different node device among the plurality of node devices, wherein if node related information of only one node device can be additionally stored in the received first frame data, the data processing unit generates second frame data including identification information of the source node device or the identification information of the destination node device as destination identification information, and the node related information within the received first frame data, and the node related information, stored in storing unit, of the node device, and also generates third frame data that does not include the node related information within the received first frame data, and the communication controlling unit respectively transfers the generated second frame data and the third frame data to one or two different node devices on the network, wherein when the communication controlling unit, operating as the destination node so that the identification information of the destination node device within the fourth frame data matches the identification information stored in the storing unit of the node device, receives fourth frame data transferred by a different node device on the network, the data processing unit generates fifth frame data including the identification information of the source node device as destination identification information, node related information within the received fourth frame data, and the node related information stored in the storing unit, and the communication controlling unit transfers the generated fifth frame data to a different node device on the network, and wherein when the communication controlling unit, operating as the source node, receives the fourth frame data from a different node device on the network, the data processing unit extracts a plurality of pieces of node related information that form one group from the received fourth frame data, and feeds the node related information of the one group to a higher-order device connected to the node device.

11. The node device according to claim 10, wherein the communication controlling unit variably decides a transfer destination of frame data so that the node device operates in the ad hoc mode.

12. The node device according to claim 10, wherein
the communication controlling unit transfers frame data in the ad hoc mode, and
the first frame data is request frame data generated by the source node device.

13. The node device according to claim 10, wherein
the communication controlling unit transfers frame data in the ad hoc mode, and
the first frame data is reply frame data generated by the source node device in response to request frame data including the identification information of the destination node device as source identification information.

14. A frame data processing method for use in a node device including a storing unit, a communication controlling unit connectable to an ad hoc network, and a data processing unit, comprising:

receiving, by the communication controlling unit, first frame data including identification information of a source node device and a destination node device from a different node device;

updating, by the data processing unit, the received first frame data by adding node related information stored in the storing unit, and transferring, by the communication controlling unit, the updated first frame data to a different node device on the network, if the node related information of two or more node devices can be additionally stored in the received first frame data;

generating, by the data processing unit, second frame data including the identification information of the source node device or the identification information of the destination node device as destination identification information, the node related information within the received first frame data, and the node related information, stored in storing unit, of the node device, and also generating, by the data processing unit, third frame data that does not include the node related information within the received first frame data, and respectively transferring, by the communication controlling unit, the generated second frame data and the third frame data to one or two different node devices on the network, if node related information of only one node device can be additionally stored in the received first frame data;

receiving, by the communication controlling unit, fourth frame data transferred by a different node device on the network;

determining, by the data processing unit, whether the identification information of the destination node device within the fourth frame data matches the identification information stored in the storing unit of the node device;

operating as the destination node device to generate fifth frame data by the data processing unit, including the identification information of the source node device as destination identification information, node related information within the received fourth frame data, and the node related information stored in the storing unit, and to transfer the fifth frame data, by the communication controlling unit, to a different node device on the network; and operating as the source node to extract, from the received fourth frame data by the data processing unit, a plurality of pieces of node related information that form one group, and to feed the node related information of the one group to a higher-order device connected to the node device.

* * * * *